United States Patent
Kweon et al.

(10) Patent No.: US 10,952,145 B2
(45) Date of Patent: Mar. 16, 2021

(54) APPARATUS AND METHOD FOR PROVIDING LOW-POWER MOBILE HOTSPOT

(71) Applicant: Samsung Electronics Co., Ltd., Suwon-si (KR)

(72) Inventors: Kisuk Kweon, Suwon-si (KR); Yongseok Park, Seoul (KR); Sanggon Lee, Suwon-si (KR); Jinyoung Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

(21) Appl. No.: 16/300,458

(22) PCT Filed: May 8, 2017

(86) PCT No.: PCT/KR2017/004746
§ 371 (c)(1),
(2) Date: Nov. 9, 2018

(87) PCT Pub. No.: WO2017/196031
PCT Pub. Date: Nov. 16, 2017

(65) Prior Publication Data
US 2019/0150093 A1    May 16, 2019

(30) Foreign Application Priority Data

May 10, 2016    (KR) .................. 10-2016-0057078

(51) Int. Cl.
*G08C 17/00* (2006.01)
*H04W 52/02* (2009.01)
(Continued)

(52) U.S. Cl.
CPC ......... *H04W 52/0241* (2013.01); *H04W 4/80* (2018.02); *H04W 28/02* (2013.01);
(Continued)

(58) Field of Classification Search
CPC ............ H04W 52/0241; H04W 52/02; H04W 52/0229; H04W 76/14; H04W 76/30; H04W 4/80; H04W 28/02; H04W 84/12; H04W 88/06
USPC ................. 370/311, 315–326; 375/211–214
See application file for complete search history.

(56) References Cited

U.S. PATENT DOCUMENTS 8,830,971 B1 * 9/2014 Shipley ................ H04W 84/12
370/338
10,123,230 B1 * 11/2018 Govindassamy ..... H04W 24/10
(Continued)

FOREIGN PATENT DOCUMENTS

| KR | 20130054373 A | 5/2013 |
| KR | 20140054914 A | 5/2014 |
| KR | 20160031409 A | 3/2016 |

OTHER PUBLICATIONS

ISA/KR, International Search Report and Written Opinion of the International Searching Authority for International Application No. PCT/US2017/004746, dated Aug. 10, 2017, 12 pages.
(Continued)

*Primary Examiner* — Thai D Hoang

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). A method for a mobile access point P) in a Wireless environment may comprise the steps of: receiving, from a station, a message indicating that uplink traffic exists, through a proximity communication path; switching a hotspot from an idle mode to an active mode, in response to the received message, transmitting, to the station, a response message to the received message through the proximity communication path, in response to the switching to the active mode; and receiving, from the station, the uplink traffic through a path on the hotspot.

18 Claims, 17 Drawing Sheets

(51) Int. Cl.
*H04W 88/06* (2009.01)
*H04W 28/02* (2009.01)
*H04W 84/12* (2009.01)
*H04W 76/30* (2018.01)
*H04W 76/14* (2018.01)
*H04W 4/80* (2018.01)
*H04W 88/04* (2009.01)
*H04W 92/18* (2009.01)

(52) U.S. Cl.
CPC ....... *H04W 52/02* (2013.01); *H04W 52/0229* (2013.01); *H04W 76/14* (2018.02); *H04W 76/30* (2018.02); *H04W 84/12* (2013.01); *H04W 88/06* (2013.01); *H04W 88/04* (2013.01); *H04W 92/18* (2013.01); *Y02D 30/70* (2020.08)

(56) References Cited

U.S. PATENT DOCUMENTS

| | | | |
|---|---|---|---|
| 2011/0122780 A1* | 5/2011 | Nieminen | H04W 52/0232 370/252 |
| 2012/0071174 A1 | 3/2012 | Bao et al. | |
| 2012/0210325 A1* | 8/2012 | de Lind van Wijngaarden | H04W 52/0258 718/103 |
| 2012/0314693 A1* | 12/2012 | Medapalli | H04W 40/02 370/338 |
| 2013/0203383 A1 | 8/2013 | Stopel et al. | |
| 2014/0206346 A1 | 7/2014 | Kiukkonen et al. | |
| 2015/0063311 A1* | 3/2015 | Chindapol | H04W 36/0005 370/332 |
| 2015/0304800 A1 | 10/2015 | Son et al. | |
| 2016/0080921 A1 | 3/2016 | Yadav et al. | |
| 2017/0302090 A1* | 10/2017 | Han | H01M 10/443 |
| 2019/0150093 A1* | 5/2019 | Kweon | H04W 52/02 370/311 |

OTHER PUBLICATIONS

Han, Hao, et al., "DozyAP: Power-Efficient Wi-Fi Tethering," The 10th International Conference in Mobile Systems, Applications, and Services (MobiSys 2012), Jun. 25-29, 2012, Low Wood Bay, Lake District, UK, 14 pages.

* cited by examiner

APPARATUS AND METHOD FOR PROVIDING LOW-POWER MOBILE HOTSPOT

CROSS-REFERENCE TO RELATED APPLICATIONS

This application is a 371 National Stage of International Application No. PCT/KR2017/004746 filed May 8, 2017, which claims priority to Korean Patent Application No. 10-2016-0057078 filed May 10, 2016, the disclosures of which are herein incorporated by reference in their entirety.

BACKGROUND

Field

The following descriptions generally relate to wireless communication, and more specifically, to an apparatus and a method for providing a mobile hotspot through low power consumption.

Background Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (NEMO), Full Dimensional MIMO (FD-MIMO), array antenna, an analog beam forming, large scale antenna techniques are discussed in 5G communication systems.

In addition, in 5G communication systems, development for system network improvements under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SOMA) as an advanced access technology have been developed.

To compensate for high mobility of a station, mobile hotspot technology using a mobile access point (AP) is used. Solutions for reducing power consumption of the mobile AP to provide the mobile hotspot are being searched.

SUMMARY

The following descriptions provide an apparatus and a method for providing a mobile hotspot by adaptively switching a mode for the sake of low power consumption.

A method of a mobile access point (AP) in a wireless environment may include receiving a message for indicating presence of uplink traffic, from a station, via a proximity communication path, in response to receiving the message, switching a mode of a hotspot from an idle mode to an active mode, in response to switching to the active mode, transmitting a response message for the message to the station, via the proximity communication path, and receiving the uplink traffic from the station, via a path on the hotspot.

A method of a station in a wireless environment may include transmitting a message for indicating presence of uplink traffic, to a mobile AP, via a proximity communication path, receiving a response message for the message from the mobile AP, via the proximity communication path, and transmitting the uplink traffic to the mobile AP, via a path on the hotspot. Herein, the response message for the message may be transmitted in response to switching a hotspot mode of the mobile AP from an idle mode to an active mode.

An apparatus of a mobile AP in a wireless environment may include at least one processor, a first transceiver for proximity communication, operatively coupled to the at least one processor, and a second transceiver for wireless local area network (WLAN) communication, operatively coupled to the at least one processor, wherein the at least one processor may be configured to receive a message for indicating presence of uplink traffic, from a station, via a proximity communication path, in response to receiving the message, switch a mode of a hotspot from an idle mode to an active mode, in response to switching to the active mode, transmit a response message for the message to the station, via the proximity communication path, and receive the uplink traffic from the station, via a path on the hotspot.

An apparatus of a station in a wireless environment may include at least one processor, a first transceiver for proximity communication, operatively coupled to the at least one processor, and a second transceiver for WLAN communication, operatively coupled to the at least one processor, wherein the at least one processor may be configured to transmit a message for indicating presence of uplink traffic, to a mobile AP, via a proximity communication path, to receive a response message for the message from the mobile AP, via the proximity communication path, and to transmit the uplink traffic to the mobile AP, via a path on the hotspot. Herein, the response message for the message may be transmitted in response to switching a hotspot mode of the mobile AP from an idle mode to an active mode.

BRIEF DESCRIPTION OF DRAWINGS

For more complete understanding, the following explanations are made in reference to the accompanying drawings. The same reference numbers in the drawings indicate like elements.

DETAILED DESCRIPTION

Figure 1:
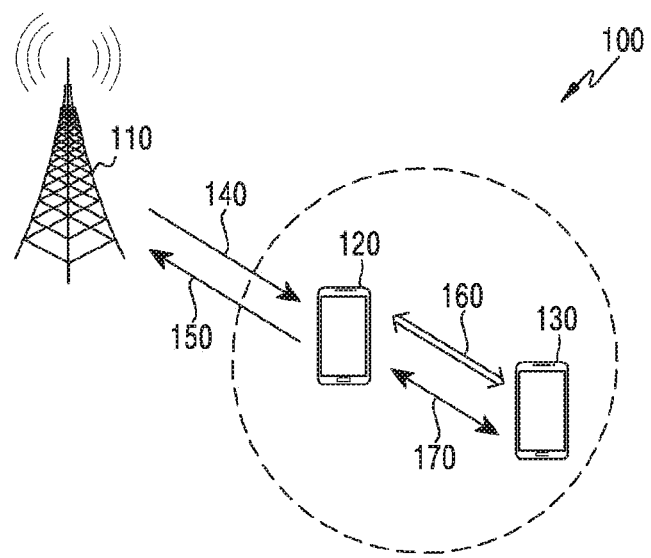
FIG. 1 illustrates an example of a wireless environment for providing a hotspot.

The terms used in the present disclosure are only used to describe specific embodiments, and are not intended to limit other embodiments. Singular expressions may include plural expressions as well unless the context clearly indicates otherwise. All terms used herein, including technical and scientific terms, may have the same meaning as those commonly understood by a person skilled in the art to which the present disclosure pertains. Terms such as those defined in a generally used dictionary may be interpreted to have the meanings equal or similar to the contextual meanings in the relevant field of art, and are not to be interpreted to have ideal or excessively formal meanings unless clearly defined in the present disclosure. In some cases, even a term defined in the present disclosure should not be interpreted to exclude embodiments of the present disclosure.

In various embodiments of the present disclosure to be described below, a hardware approach will be described as an example. However, since the various embodiments of the present disclosure include a technology using both hardware and software, the various embodiments of the present disclosure do not exclude a software-based approach.

The following descriptions relate to an apparatus and a method for providing a mobile hotspot.

Terms indicating control information, terms indicating network entities, terms indicating messages, and terms indicating components of an apparatus, which are used in the following descriptions, are for the sake of explanations. Accordingly, the present disclosure is not limited to the terms to be described, and may use other terms having technically identical meaning.

A hotspot indicates a region for providing a station such as a notebook, a tablet personal computer (PC), with a service such as Internet over a wireless local area network (WLAN). A service for such a hotspot may be provided via a fixed access point (AP), or provided via a mobile AP. The mobile AP may indicate a device which provides the hotspot service with mobility. The hotspot service provided by the mobile AP may be referred to as a mobile hotspot or a mobile hotspot service. The mobile hotspot may supplement a coverage area of the fixed AP or a coverage area of a cellular network service. In addition, the mobile hotspot may give stability to the station by enabling the station moving fast to perform communication without an operation such as handover.

Meanwhile, the number of stations which access the Internet using only the WLAN without subscribing to the cellular network service is recently increasing. Hence, needs for the mobile hotspot is also rapidly growing. However, the mobile AP (e.g., a smart phone, etc.) which provides the current mobile hotspot does not provide a power saving mode (PSM) for reducing power consumption of the mobile AR As a result, if providing the mobile hotspot, the current mobile AP consumes considerable power.

Thus, the following descriptions provide an apparatus and a method for adaptively switching a mode of the hotspot according to a traffic state.

FIG. 1 illustrates an example of a wireless environment for providing a hotspot.

As shown in FIG. 1, a wireless environment 100 may include a base station 110, a mobile AP 120, and a station (STA) 130.

The base station 110 may be a base station for cellular communication. The base station 110 may communicate with the mobile AP 120 using a cellular communication path. For example, the base station 110 may transmit traffic to the mobile AP 120 via a downlink 140. In another example, the base station 110 may receive traffic from the mobile AP 120 via an uplink 150.

According to a communication protocol or a communication scheme, the base station 110 may be referred to as a term such as "base station", "evolved node B (eNB)", "access point".

The mobile AP 120 may be a device which receives a service from the base station 110. For example, the mobile AP 120 may be a mobile phone, a smartphone, a music player, a portable game console, a navigation system, and a laptop computer, which receives the service from the base station 110 by joining the cellular communication In some embodiments, the mobile AP 120 may generate a hotspot based on the cellular communication service provided from the base station 110. For example, the mobile AP 120 may generate the hotspot to the STA 130, by activating a tethering or mobile hotspot function of the mobile AP 120.

In some other embodiments, the mobile AP 120 may be a device which provides a Wi-Fi service directly, rather than receiving the service from the base station 110. For example, the mobile AP 120 may be a device which provides the hotspot to the STA 130 using a service such as Wi-Fi direct.

The mobile AP 120 may be a device for using a proximity communication or peer-to-peer (P2P) communication function. For example, the mobile AP 120 may communicate with the STA 130 through Bluetooth, ZigBee, or Bluetooth low energy (BLE) scheme.

According to the communication protocol or the communication scheme, the mobile AP 120 may be referred to as a "user equipment (UE)", "terminal", "mobile station (MS), "STA".

The STA 130 may be a device which receives the Wi-Fi service from the mobile AP 120, rather than receiving the service from the base station 110. For example, the STA 130 may be a mobile phone, a smartphone, a music player, a portable game console, a navigation system, a laptop computer, and the like, which does not join the cellular communication but performs wireless communication with other peer. In another example, the STA 130 may be a mobile phone, a smartphone, a music player, a portable game console, a navigation system, a laptop computer, and the like, which wirelessly communicates with other peer while deactivating the cellular communication function.

The STA 130 may a device for using the proximity communication or P2P communication function. For example, the STA 130 may communicate with the mobile AP 120 through Bluetooth, ZigBee, or BLE scheme.

According to the communication protocol or the communication scheme, the mobile AP 120 may be referred to as a "UE", "terminal", "mobile station", "STA".

The mobile AP 120 and the STA 130 may send and receive messages, signals, information, packets, and so on, through a proximity communication path 160. The proximity communication path 160 may be a path for the direct communication between the mobile AP 120 and the STA 130. In some embodiments, the proximity communication path 160 may be a path which provides the communication service with low power. In some other embodiments, the proximity communication path 160 may be a path for flexibly changing the service by changing software (S/W), without changing the protocol. In some other embodiments, the proximity communication path 160 may be a path for assisting a path 170 on hotspot.

The mobile AP 120 and the STA 130 may send and receive messages, signals, information, packets, and so on, through the path 170 on hotspot. In other words, the mobile AP 120 may provide the hotspot to the STA 130. For example, the STA 130 may receive traffic or data of other peer from the mobile AP 120 via the path 170 on hotspot. In another example, the STA 130 may transmit traffic or data for the other peer to the mobile AP 120 via the path 170 on hotspot.

In some embodiments, if determining that there is no STA (e.g., the STA 130) which currently uses the hotspot generated by the mobile AP 120, the mobile AP 120 may switch a mode of the hotspot from an active mode to an idle mode. The active mode may be a mode which maintains an awake state of the mobile AP 120, to provide downlink traffic to the STA which uses the hotspot or to receive uplink traffic from the STA which uses the hotspot. In other words, the active mode may be the mode for keeping the hotspot active. The idle mode may be a mode for maintaining the hotspot inactive (a deactive mode or a deactivate mode), to reduce the power consumption.

Figure 2:
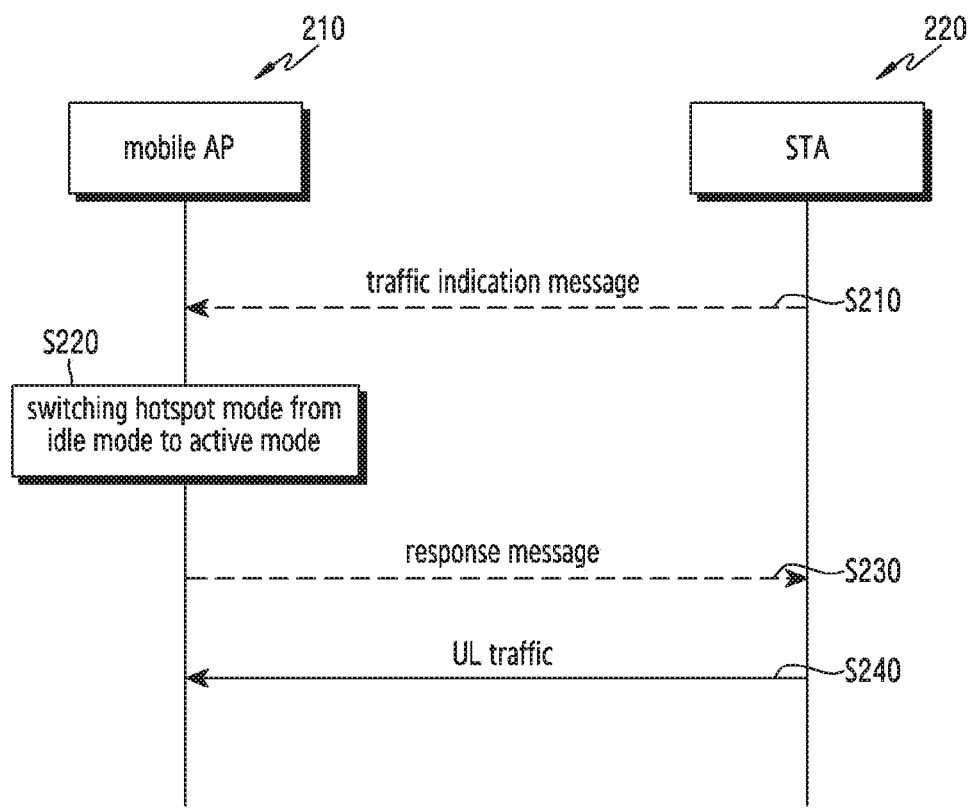
FIG. 2 illustrates an example of signal flows between a mobile access point (AP) and a station for switching a mode of a hotspot.

FIG. 2 illustrates an example of signal flows between a mobile AP and an STA for switching a mode of a hotspot.

As shown in FIG. 2, in step S210, the STA 220 may transmit a message indicating a presence of uplink traffic (traffic indication message) to the mobile AP 210, through a proximity communication path between the mobile AP 210 and the STA 220. The transmitted traffic indication message may be the message for switching a mode of a hotspot of the mobile AP 210 from the idle mode to the active mode. Through a timer shared between the STA 220 and the mobile AP 210, the STA 220 may recognize (or detect) that the hotspot mode of the mobile AP 210 is the idle mode. If the hotspot mode of the mobile AP 210 is the idle mode, the STA 220 may transmit the message indicating the presence of uplink traffic, to the mobile AP 210, through the proximity communication path.

In some other embodiments, unlike the example of FIG. 2, the STA 220 may transmit a message indicating status information of the STA 220, instead of the message indicating the presence of uplink traffic of the step S210. For example, if power of a display unit of the STA 220 is OFF because the STA 220 is not used, the STA 220 may transmit a message indicating the power OFF state of the display unit of the STA 220, to the mobile AP 210, through the proximity communication path.

In some other embodiments, unlike the example of FIG. 2, if the STA 220 determines that the mobile AP 210 is active, the STA 220 may not perform the procedure of the step S210.

The STA 220 may further insert information for communicating with the mobile AP 210 into the transmitted message. In some embodiments, the transmitted message may further include the uplink traffic information. The uplink traffic information may include information such as type of the uplink traffic, attribute of the uplink traffic, size or amount of the uplink traffic. In some other embodiments, the transmitted message may include information about a timer for switching the hotspot mode of the mobile AP 210. For example, the STA 220 may generate at least one parameter for determining the timer based on the size or amount of the uplink traffic, the type of the uplink traffic, and/or the attribute of the uplink traffic. The STA 220 may transmit to the mobile AP 210 the message indicating the presence of uplink traffic including information of at least one parameter generated. In this case, the mobile AP 210 may determine a length of the timer based on the received at least one parameter information and/or parameter information received from at least one other STA.

In step S220, the mobile AP 210 may, in response to receiving the message indicating the presence of uplink traffic, switch the hotspot mode from the idle mode to the active mode. The mobile AP 210 may switch the hotspot mode from the idle mode to the active mode, in order to receive the uplink traffic via a path on hotspot.

In some embodiments, the switching of the hotspot mode (e.g., switching from the idle mode to the active mode, or switching from the active mode to the idle mode, etc) may be implemented using other methods. For example, instead of switching the hotspot mode from the active mode to the idle mode, the mobile AP 210 may switch the mobile hotspot function from ON to OFF. In another example, instead of switching the hotspot mode from the active mode to the idle mode, the mobile AP 210 may switch the mobile hotspot function from OFF to ON.

In step S230, the mobile AP 210 may transmit a response message to the STA 220, through the proximity communication path. The response message may be an acknowledgement message for the uplink traffic indication message. The response message may be a message indicating that the hotspot mode of the mobile AP is switched to the active mode. The response message may be a message indicating that the mobile AP 210 is capable of receiving the uplink traffic.

In some embodiments, the response message may further include timer length information (or value) for switching the hotspot mode of the mobile AP. The timer length information may be included in the response message, so that the mobile AP 210 may notify a mode switch timing of the mobile AP 210 to the STA 220.

In step S240, the STA 220 may transmit the uplink traffic to the mobile AP 210 via the path on the hotspot. For example, the STA 220 may transmit the uplink traffic to the mobile AP 210 via the path on the hotspot, in order to upload data to a server or to provide data to other peer.

As stated above, the mobile AP 210 of the idle mode may switch the hotspot mode to the active mode based on the indication message received through the proximity communication path. The mobile AP 210 may operate in the idle mode until the indication message is received, thus reducing the power consumption due to the hotspot.

Figure 3:
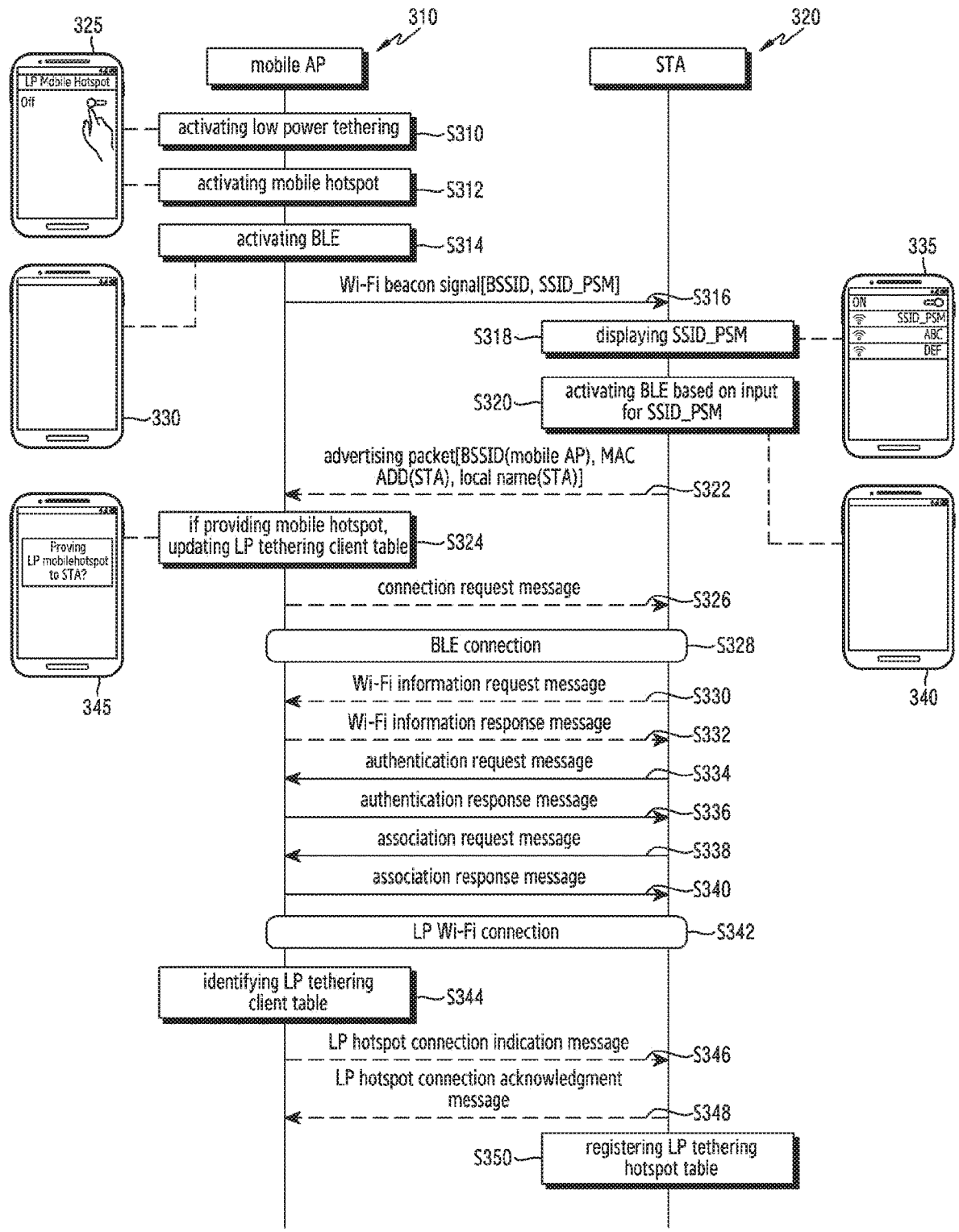
FIG. 3 illustrates an example of signal flows between a mobile AP and a station for generating a low power (LP) hotspot connection.

FIG. 3 illustrates an example of signal flows between a mobile AP and an STA for generating an LP hotspot connection.

As shown in FIG. 3, the mobile AP 310 may activate a low power tethering function in step S310. For example, the mobile AP 310 may display a user interface (UI) 325 in response to an input for the low power tethering.

In step S312, in response to the activation of the low power tethering function, the mobile AP 310 may activate a hotspot function. In some embodiments, in response to an input to an object associated with the LP mobile hotspot, the mobile AP 310 may activate the hotspot function. For example, the mobile AP 310 may activate the hotspot function, in response to a user input for an object in the UI 325.

In step S314, in response to the activation of the low power tethering function, the mobile AP 310 may activate a BLE function of the mobile AP 310. While the mobile AP 310 activates the BLE function in FIG. 3 (e.g., a Bluetooth state icon displayed on the UI 330) for the sake of explanations, other proximity communication scheme or P2P communication scheme may be activated according to an embodiment. In other words, the BLE function is merely an illustrative example, and various communication techniques for assisting the path on the hotspot between the mobile AP 310 and the STA 320 may be used for the mobile AP 310 and the STA 320.

In step S316, the mobile AP 310 may broadcast a Wi-Fi beacon signal for indicating that the hotspot of the mobile AP 310 is activated using a Wi-Fi communication scheme. For example, the mobile AP 310 may broadcast the Wi-Fi beacon signal to inform neighboring STAs of the hotspot activation of the mobile AP 310. The Wi-Fi beacon signal may include a basic service set identifier (BSSID) and a service set identifier power save mode (SSID_PSM).

The BSSID may be an identifier for identifying a BSS. In some embodiments, the BSSID may include 48 bits. The BSSID may, according to an embodiment, be generated based on medium access control (MAC) of the mobile AP 310, or generated with an arbitrary value.

The SSID_PSM may be an identifier used to identify a device which provides a BSS or WLAN service. The SSID_PSM may be an identifier for indicating that the mobile AP 310 provides the LP hotspot.

For example, the SSID_PSM may be an identifier generated by inserting the PSM into the SSID to indicate that the mobile AP 310 provides the LP hotspot. While FIG. 3 shows the example of inserting the PSM into the SSID, various modifications may be made on the SSID_PSM. For example, the SSID_PSM may be generated as PSM_SSID. That is, this disclosure does not exclude SSID_PSM of various formats for identifying the LP hotspot and a normal hotspot.

In some embodiments, the SSID_PSM may be a unique identifier including characters inserted into a packet header.

In step S318, the STA 320 may display the SSID_PSM on a display unit of the STA 320 in response to receiving the Wi-Fi beacon signal. In some embodiments, the STA 320 may display the SSID_PSM over a plurality of SSIDs indicating the normal hotspot, to highlight the LP hotspot. For example, the STA 320 may display the SSID_PSM at the top, as shown in a UI 335. In some other embodiments, the STA 320 may display the SSID_PSM in a different color from with the plurality of the SSIDs indicating the normal hotspot, to highlight the LP hotspot. That is, various displaying methods for highlighting the SSID_PSM may be applied at the STA 320.

In step S320, the STA 320 may activate the BLE based on an input for the displayed SSID_PSM. The STA 320 may activate the BLE, to assist the LP hotspot (or LP Wi-Fi connection). The STA 320 may display the BLE activation through various methods. For example, the STA 320 may indicate the BLE activation with a status icon in a UI 340.

In step S322, the STA 320 may transmit an advertising packet to the mobile AP 310 using the proximity communication scheme. The advertising packet may be a packet for the STA 320 to generate a BLE connection with the mobile AP 310. For example, the STA 320 may transmit the advertising packet to the mobile AP 310, to generate the BLE connection for assisting the LP hotspot of the mobile AP 310. The advertising packet may be a packet for indicating that the Wi-Fi beacon signal is received. The advertising packet may be a packet for indicating that the STA 320 intends to perform the procedure for generating the path on the hotspot with the mobile AP 310.

In some embodiments, the STA 320 may transmit the advertising packet including the BSSID of the mobile AP 310, a MAC address (ADD) of the STA 320, and a local name of the STA 320. In some embodiments, the advertising packet may further include a service ID (e.g., service UUID) for transmitting the advertising packet. The BSSID of the mobile AP 310 may be information for the mobile AP 310 to filter out an advertising packet transmitted from other STA to other AP. For example, if the BSSID in the advertising packet is not the BSSID of the mobile AP 310, the mobile AP 310 may not display information according to the advertising packet. The MAC ADD and the local name may be information required for the Wi-Fi connection (or the LP Wi-Fi connection) between the STA 320 and the mobile AP 310. The MAC ADD and the local name may be information for indicating that the mobile STA 320 has generated the LP Wi-Fi connection with the mobile AP 310. For example, if successfully generating the LP Wi-Fi connection with the STA 320, the mobile AP 310 may map the MAC ADD and the local name with the STA 320 and store them in an LP tethering client table to be explained.

In step S324, the mobile AP 310 identifies whether the received advertising packet includes the BSSID of the mobile AP 310. If the received advertising packet includes the BSSID, the mobile AP 310 may display a message indicating that the STA 320 wants to receive the hotspot from the mobile AP 310. For example, the mobile AP 310 may display a message of a UI 345 on the display unit of the mobile AP 310. The mobile AP 310 may, if detecting an input for indicating the hotspot provision to the STA 320, store the local name of the STA 320 and the MAC ADD of the STA 320 in the LP tethering client table. In addition, the mobile AP 310 may store the local name of the STA 320 and the MAC ADD of the STA 320, to reduce complexity in procedures after an initial LP Wi-Fi connection procedure. Also, the mobile AP 310 may store the local name of the STA 320 and the MAC ADD of the STA 320, as information regarding the STA 320, in a storage unit of the mobile AP 310.

In step S326, the mobile AP 310 may transmit a connection request message to the STA 320. The mobile AP 310 may request the STA 210 to establish a BLE connection, to assist the LP Wi-Fi connection between the mobile AP 310 and the STA 320. The STA 320 may receive the connection request message transmitted from the mobile AP 310.

In step S328, the mobile AP 310 and the STA 320 may establish (or generate) the BLE connection. In other words, the mobile AP 310 and the STA 320 may generate a proximity communication path between the mobile AP 310 and the STA 320. The BLE connection may be used for a procedure for generating the LP Wi-Fi connection between the mobile AP 310 and the STA 320, a procedure for maintaining the LP Wi-Fi connection, and so on.

In step S330, in response to generating the BLE connection, the STA 320 may transmit a Wi-Fi information request message to the mobile AP 310 through the BLE connection. The STA 320 may transmit the Wi-Fi information request message to the mobile AP 310 through the established (or generated) BLE connection, to generate the LP Wi-Fi connection with the mobile AP 310. The Wi-Fi information request message may be a message for requesting information for establishing the LP Wi-Fi connection between the mobile AP 310 and the STA 320.

In step S332, in response to receiving the Wi-Fi information request message from the STA 320, the mobile AP 310 may transmit a information response message to the STA 320 through the BLE connection (or the proximity communication) path. The Wi-Fi information response message may include information for the STA 320 to access the mobile AP 310. For example, the Wi-Fi information response message may include SSD information of the mobile AP 310, and password (for Wi-Fi connection) information of the mobile AP 310.

In step S334, the STA 320 may transmit an authentication request message to the mobile AP 310 to establish identity. To perform authentication with the mobile AP 310, the STA 320 may transmit the authentication request message, as a Wi-Fi signal, to the mobile AP 310.

In step S336, in response to receiving the authentication request message transmitted from the STA 320, the mobile PA 310 may transmit an authentication response message to the STA 320. The authentication response message may be a message for indicating whether the authentication is successful (or fails) according to the authentication request message.

In step S338, in response to receiving the authentication response message, the STA 320 may transmit an association request message to the mobile AP 310. More specifically, the STA 320 may transmit the association request message to the mobile AP 310 to obtain the full access.

In step S340, in response to receiving the association request message, the mobile AP 310 may transmit an association response message to the STA 320. The association response message may include response information and identification information for the association request message. For example, the association response message may include an indicator which indicates the success or the failure of the association request, and an association ID (AID). The AID may be used to identify a buffered frame in the power save mode.

In step S342, the mobile AP 310 and the STA 320 may generate (or establish) an LP Wi-Fi connection. In other words, the mobile AP 320 and the STA 310 may generate a path on a hotspot which provides an LP mode.

In step S344, the mobile AP 310 may determine (or identify) whether the STA 320 which establishes the LP Wi-Fi connection is an STA stored in the LP tethering client table. For example, the mobile AP 310 may identify whether the STA 320 is an STA stored in the LP tethering client table, by comparing the obtained MAC ADD with information stored in the LP tethering client table, based on the LP Wi-Fi connection.

In step S346, if the STA 320 is the stored STA, the mobile AP 310 may transmit an LP hotspot connection indication message for indicating that the LP Wi-Fi connection is successfully generated with the STA 320, to the STA 320 through the proximity communication path (the BLE connection). Step S346 describes the example where the mobile AP 310 transmits the LP hotspot connection indication message via the BLE connection or the proximity communication path. However, this is merely the example for descriptions, and the mobile AP 310 may transmit the LP hotspot connection indication message via the LP connection or the path on the hotspot.

In some embodiments, the LP hotspot connection indication message may include information for indicating a timer to switch the hotspot mode of the mobile AP 310, regardless of the transmission path of the hotspot connection indication message. The tinier may indicate time taken for the mobile AP 310 to switch from the active mode to the idle mode or from the idle mode to the active mode. The timer may be reset in response to traffic generated at the mobile AP 310 and/or the STA 320. The timer may be shared between the mobile AP 310 and the STA 320. For example, the mobile AP 310 may provide a value regarding the tinier directly to the STA 320. In another example, the mobile AP 310 may provide information corresponding to the timer to the STA 320.

In step S348, the STA 320 may transmit an LP hotspot connection acknowledgement message to the mobile AP 310, through the proximity communication path. The LP hotspot connection acknowledgement message may be a message for indicating that the LP hotspot connection indication message is received successfully. The LP hotspot connection acknowledgement message may be a message for indicating that the STA 320 normally accesses the mobile AP 310. In some embodiments, the STA 320 may transmit the LP hotspot connection acknowledgement message to the mobile AP 310 via the path on the hotspot.

In step S350, the STA 320 may register the mobile AP 310 in an LP tethering hotspot table. The LP tethering hotspot table may be data for reducing complexity of an event occurring with the mobile AP 310 after the initial access. The LP tethering hotspot table may be a database for storing information about an AP which provides the LP Wi-Fi connection, to which the STA 320 has accessed.

As stated above, the mobile AP 310 and the STA 320 may generate an LP Wi-Fi connection (or the path on the hotspot) through dual-connection. The mobile AP 310 may adaptively switch the hotspot mode according the status such as traffic, through the generated LP Wi-Fi connection. The mobile AP 310 may reduce the power consumption associated with the hotspot service through the above-mentioned mode switch. The STA 320 may maintain mobility and stably use the wireless access service, through the generated LP Wi-Fi connection.

Figure 4:
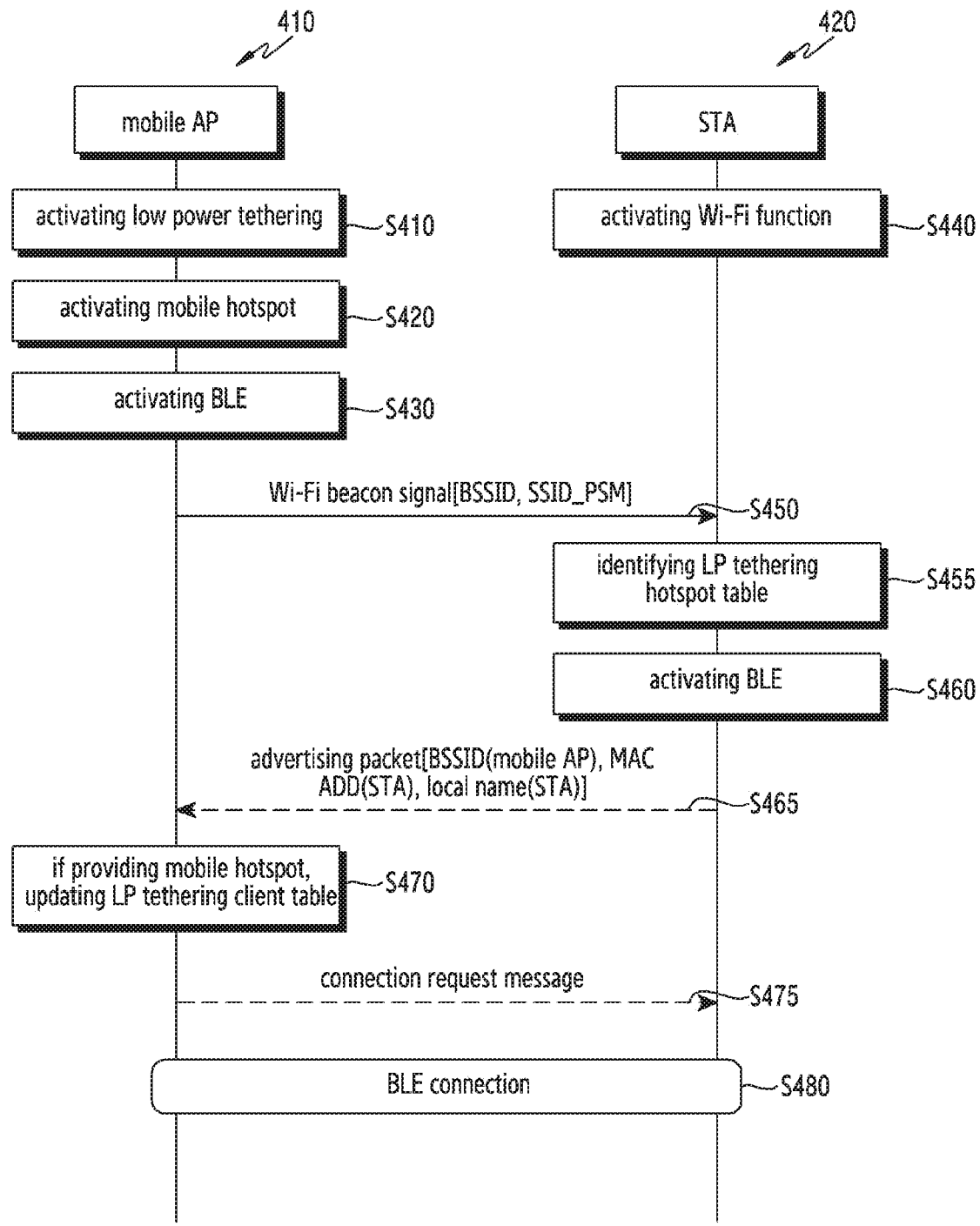
FIG. 4 illustrates an example of signal flows between a station and a mobile AP for reconnection.

FIG. 4 illustrates an example of signal flows between an STA which performs reconnection and a mobile AP.

As shown in FIG. 4, an STA 420 may activate a Wi-Fi function in step S440. For example, the STA 420 may activate the Wi-Fi function in response to an input for a Wi-Fi icon in a setting menu of the STA 420, or activate the Wi-Fi function in response to an input for a Wi-Fi icon in a quick menu of the STA 420. By activating the Wi-Fi function, the STA 420 may receive (or listen to) Wi-Fi beacon signals from neighboring devices.

Meanwhile, a mobile AP 410 may perform operations corresponding to the operations of steps S310, S312, S314, and S316 in steps S410, S420, S430, and S450 respectively.

In step S455, in response to receiving a Wi-Fi beacon signal transmitted from the mobile AP 410, the STA 420 may identify the LP tethering hotspot table. The STA 420 may identify whether the mobile AP 410 is registered in the LP tethering hotspot table based on BSSID information of the mobile AP 410 and/or SSID_PSM information of the mobile AP 410 included in the Wi-Fi beacon signal. Since FIG. 4 is a scenario where the STA 420 re-accesses the mobile AP, the STA 420 may identify the mobile AP 410 in the LP tethering hotspot table. For example, the STA 420 may identify the re-access to the mobile AP 410 based on the information about the mobile AP 410 registered in the procedure of step S350 of FIG. 3 and the received BSSID and SSID_PSM information.

In step S460, the STA 420 may activate the BLE. The STA 420 may activate the BLE to assist the LP Wi-Fi connection with the mobile AP 410.

In step S465, the STA 420 may broadcast an advertising packet using the activated BLE. For the LP Wi-Fi connection with the mobile AP 410, the STA 420 may transmit the advertising packet by including BSSID of the mobile AP 410, MAC ADD of the mobile AP 410, a local name of the STA 420, and Service UUID of the STA 420.

In step S470, the mobile AP 410 may identify information of the STA 420 in the LP tethering client table. If determining that additional information of the STA 420 is included in the received advertising packet, the mobile AP 410 may update the LP tethering client table. For example, if the advertising packet includes a parameter for determining the timer, the mobile AP 410 may update information of the parameter in the LP tethering client table or other table of a similar configuration. For another example, if the advertising packet includes change information of identification information of the STA 420, the mobile AP 410 may update the LP tethering client table by inserting the change information.

In steps S475 and S480 respectively, the mobile AP 410 may perform the same or similar operations to steps S326 and S328, respectively, of FIG. 3.

Next, the mobile AP 410 and the STA 420 may generate the path on the hotspot through a similar operation or procedure to S330 through S342 of FIG. 3.

As stated above, the STA 420 may perform the reconnection procedure with less complexity than the initial access procedure of FIG. 3, by means of the LP tethering hotspot table. Meanwhile, the mobile AP 410 may flexibly handle an event which may occur, by updating the information received from the STA 420 through the reconnection procedure in the LP tethering client table or a similar table.

Figure 5:
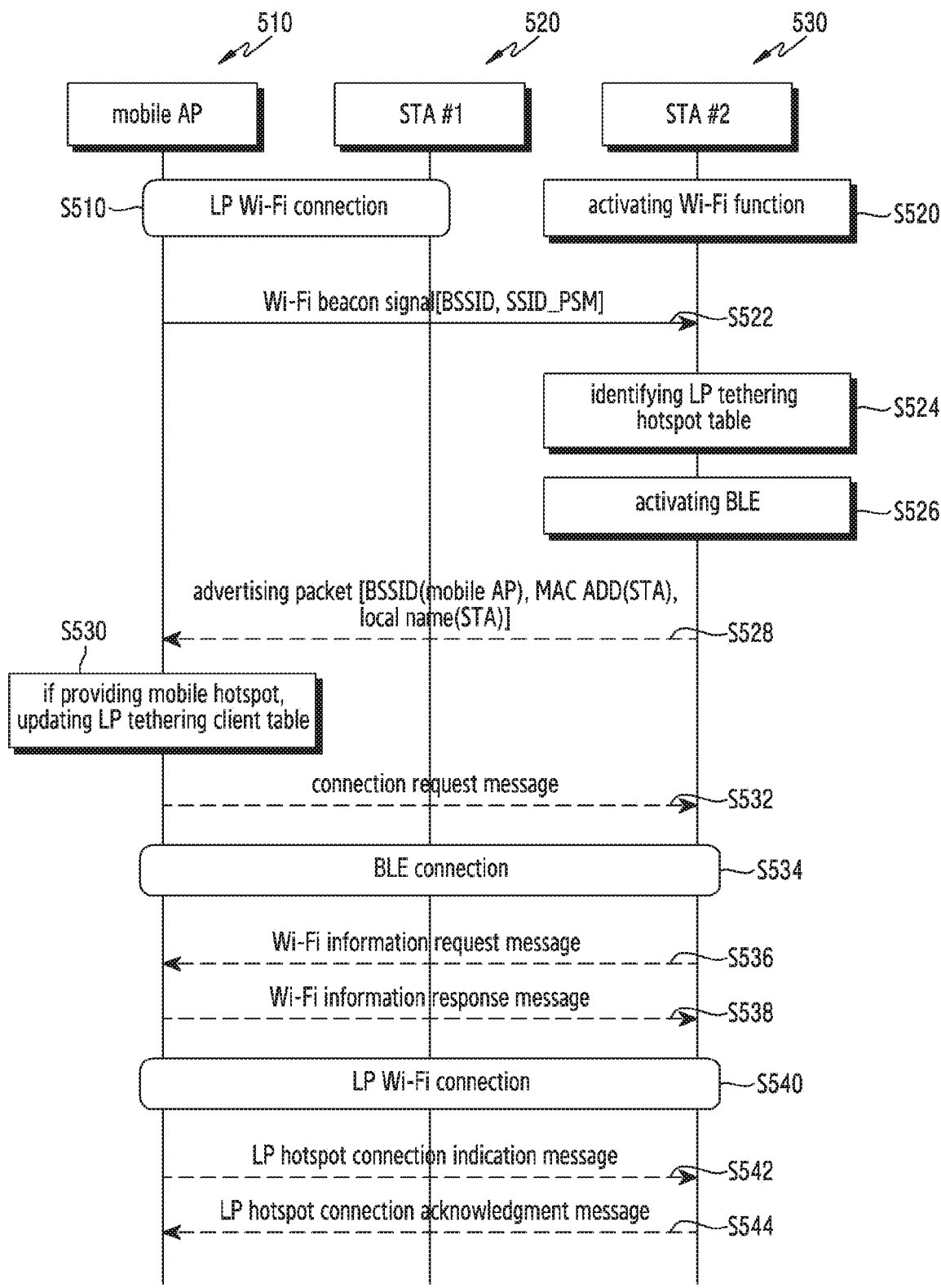
FIG. 5 illustrates an example of signal flows between a mobile AP and stations for multiple accesses through a LP Wi-Fi connection.

FIG. 5 illustrates an example of signal flows between a mobile AP and STAs which perform multiple accesses through a LP Wi-Fi connection.

A second STA 530 of FIG. 5 may be an STA which supports the LP Wi-Fi connection. For example, the second STA 530 may be an STA having software, hardware, and/or configuration for the LP Wi-Fi connection. In another example, the second STA 530 may perform similar functions to the STA 320 of FIG. 3, the STA 420 of FIG. 4.

As shown in FIG. 5, in step S510, a mobile AP 510 and a first STA 520 build the LP Wi-Fi connection. For example, the mobile AP 510 and the first STA 520 may generate the LP Wi-Fi connection through the method of FIG. 3 or FIG. 4.

Meanwhile, the second STA 530 may activate a Wi-Fi function of the second STA 530.

In step S522, the mobile AP 510 may perform the same or similar operation to the operation of step S316 of FIG. 3.

In step S524, the second STA 530 may identify an LP tethering hotspot table based on identification information included in the Wi-Fi signal beacon. If information of the mobile AP 510 is stored in the LP tethering hotspot table, the second STA 530 may perform an operation of step S526. By contrast, if the information of the mobile AP 510 is not stored in the LP tethering hotspot table, the second STA 530 may perform the same or similar procedure to the procedure of FIG. 3.

In step S526, the second STA 530 may activate the BLE function, to assist in generating a path on the hotspot between the mobile AP 510 and the second STA 530.

In step S528, the second STA 530 may broadcast an advertising packet including BSSID of the second STA 530, MAC ADD of the second STA 530, a local name of the second STA 530, and service UUID of the second STA 530.

In step S530, the mobile AP 510 may receive the broadcast advertising packet. If providing the hotspot to the second STA 530, the mobile AP 510 may identify or update the LP tethering client table.

In step S532, the mobile AP 510 may transmit a connection request message for the advertising packet to the second STA 530.

In step S534, the mobile AP 510 and the second STA 530 may finish the B connection procedure.

In step S536, the second STA 530 may transmit a Wi-Fi information request message to the mobile AP 510, via the BLE connection.

In step S538, the mobile AP 510 may transmit a Wi-Fi information response message including SSID (or BSSID, SSID_PSM) and password of the mobile AP 510 to the second STA 530, via the BLE connection.

In step S540, the mobile AP 510 and the second STA 530 may independently generate an LP Wi-Fi connection with the first STA 520.

In step S542, the mobile AP 510 may transmit an LP hotspot connection indication message indicating that the second STA 530 successfully accesses the mobile AP 510 through the BLE connection (or the proximity communication path).

In step S544, the second STA 530 may transmit an LP hotspot connection acknowledgement message for indicating that the LP hotspot connection indication message is successfully received to the mobile AP 510 through the proximity communication path.

As stated above, the mobile AP 510 which provides the LP hotspot may support the multiple connections in a similar procedure of FIG. 3 and FIG. 4. This is because the second STA 530 is the STA which supports the LP Wi-Fi connection. It should be noted that, if an STA which does not support the LP Wi-Fi connection accesses the mobile AP 510, other signal flow or other operational procedure may be used.

Figure 6:
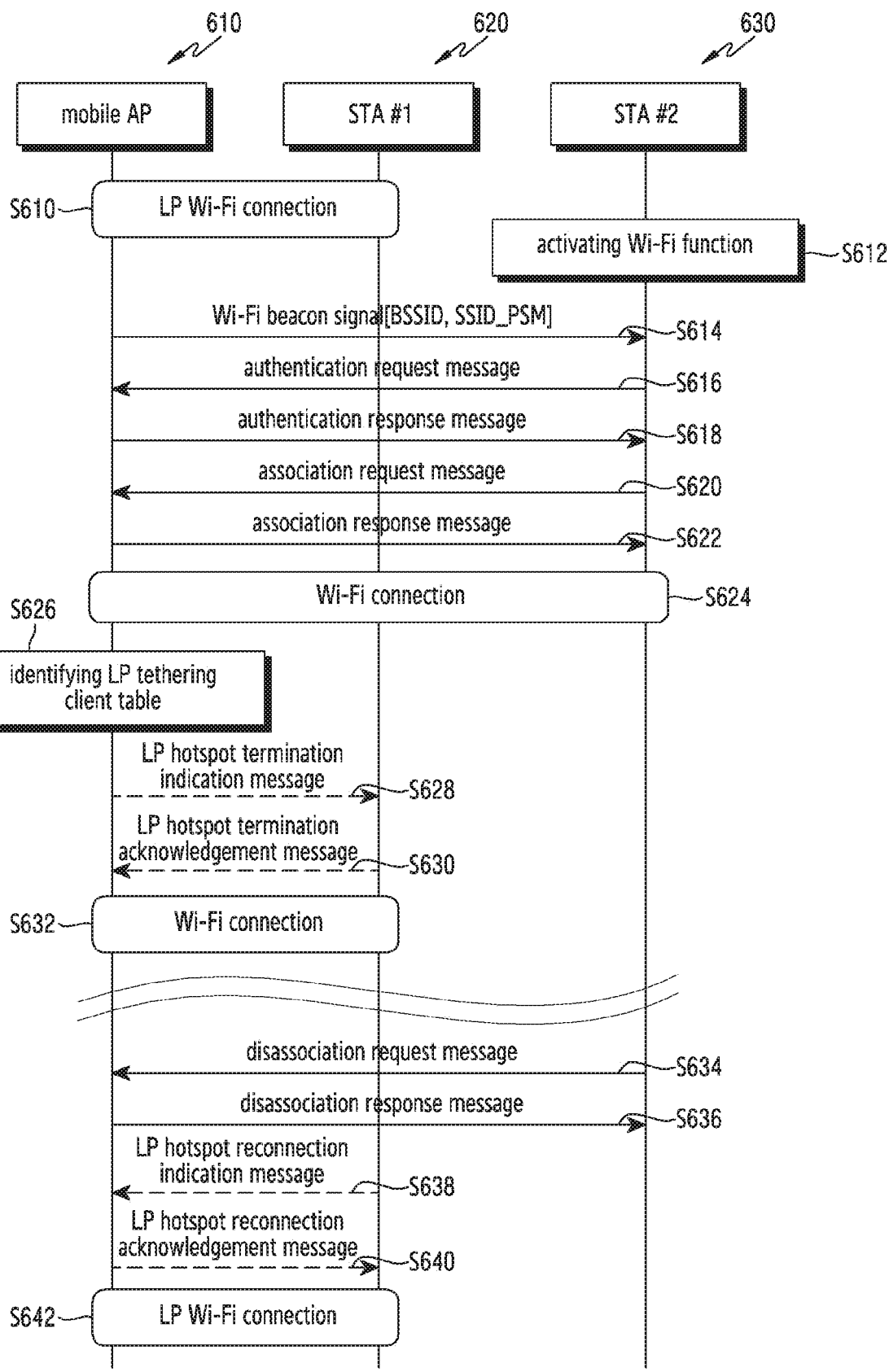
FIG. 6 illustrates another example of signal flows between a mobile AP and stations for multiple accesses through a LP Wi-Fi connection.

FIG. 6 illustrates another example of signal flows between a mobile AP and STAs for multiple accesses through an LP Wi-Fi connection.

A second STA 630 of FIG. 6 may be an STA which does not support the LP Wi-Fi connection. For example, the second STA 630 may be an STA including no software, hardware, and/or configuration for the LP Wi-Fi connection.

As shown in FIG. 6, in step S610, a mobile AP 610 and the second STA 620 may provide or receive traffic through the LP Wi-Fi connection. For example, the mobile AP 610 and the second STA 620 may communicate user data through the LP connection generated in the procedures of FIG. 3 and FIG. 4.

Meanwhile, in step S612, the second STA 630 may activate a Wi-Fi function. The second STA 630 may activate the Wi-Fi function, to receive Wi-Fi beacon signals from neighboring APs.

In step S614, the mobile AP 610 may transmit a Wi-Fi beacon signal. The mobile AP 610 may periodically transmit the Wi-Fi beacon signal, for neighboring STAs. The Wi-Fi beacon signal may include BSSID of the mobile AP 610, and SSID_PSM of the mobile AP 610.

In step S616, the second STA 630 may transmit an authentication request message, to access the mobile AP 610. The authentication request message may be a message for a normal Wi-Fi connection, rather than the LP Wi-Fi connection. For example, the second STA 630, which does not have a configuration for the LP connection, may transmit a normal authentication request message to the mobile AP 610, without activating the proximity communication (or BLE) for the LP Wi-Fi connection.

In step S618, the mobile AP 610 may transmit an authentication response message corresponding to the authentication request message to the second STA 630.

In step S620, the second STA 630 may transmit an association request message to the mobile AP 610 for the sake of full access.

In step S622, the mobile AP 610 may transmit an association response message for indicating that the association request message is approved, to the second STA 630.

In step S624, the mobile AP 610 and the second STA 630 may generate normal connection. The mobile AP 610 may generate the normal Wi-Fi connection with the second STA 630, unlike the connection with the first STA 620.

Meanwhile, due to the generated Wi-Fi connection h the second STA 630, the mobile AP 610 and the first STA 620 do not need to maintain the LP Wi-Fi connection. This is because the mobile AP 610 always maintains a wake up state (or the active mode) because of the generated normal Wi-Fi connection.

Accordingly, in step S626, the mobile AP 610 may identify that the second STA 630 does not support the LP Wi-Fi connection, through the LP tethering client table. As aforementioned, since the mobile AP 610 always maintains the active mode due to the access of the second STA 630, the mobile AP 610 may operate to switch the Wi-Fi connection of the first STA 620 to the normal Wi-Fi connection in a next procedure.

In step S628, the mobile AP 610 may transmit an LP hotspot termination indication message for terminating the LP Wi-Fi connection to the first STA 620, through the proximity communication path.

In step S630, the first STA 620 may transmit an LP hotspot termination acknowledgement message for indicating that the LP hotspot termination indication message is successfully received and the LP hotspot termination is approved to the mobile AP 610, through the proximity communication path.

In step S632, the mobile AP 610 and the first STA 620 may switch (or change) the LP Wi-Fi connection to a Wi-Fi connection.

In step S634, the second STA 630 may transmit a disassociation request message to the mobile AP 610. For example, if the second STA 630 deactivates the Wi-Fi function or leaves a hotspots range of the mobile AP 610, the second STA 630 may transmit the disassociation request message to the mobile AP 610.

In step S636, the mobile AP 610 may transmit a disassociation response message corresponding to the disassociation request message to the second STA 630. Based on the disassociation response messages and/or the disassociation request message, the Wi-Fi connection between the mobile AP 610 and the second STA 630 may be released.

In step S638, the mobile AP 610 may transmit an LP hotspot reconnection indication message to the first STA 620, through the proximity communication path.

In step S640, the first STA 620 may transmit an LP hotspot reconnection acknowledgement message corresponding to the LP hotspot reconnection indication message to the mobile AP 610, through the proximity communication path. The LP hotspot reconnection acknowledgement message may be a message for indicating that the LP hotspot reconnection indication message is successfully received and the LP Wi-Fi reconnection is approved.

In step S642, the mobile AP 610 and the first STA 620 may re-generate the LP Wi-Fi connection.

Unlike FIG. 5, FIG. 6 illustrates the scenario where the STA not supporting the LP Wi-Fi connection accesses the mobile AP 610. The mobile AP 610 may selectively switch the LP Wi-Fi connection and the normal Wi-Fi connection flexibly, depending on STA capability.

Figure 7:
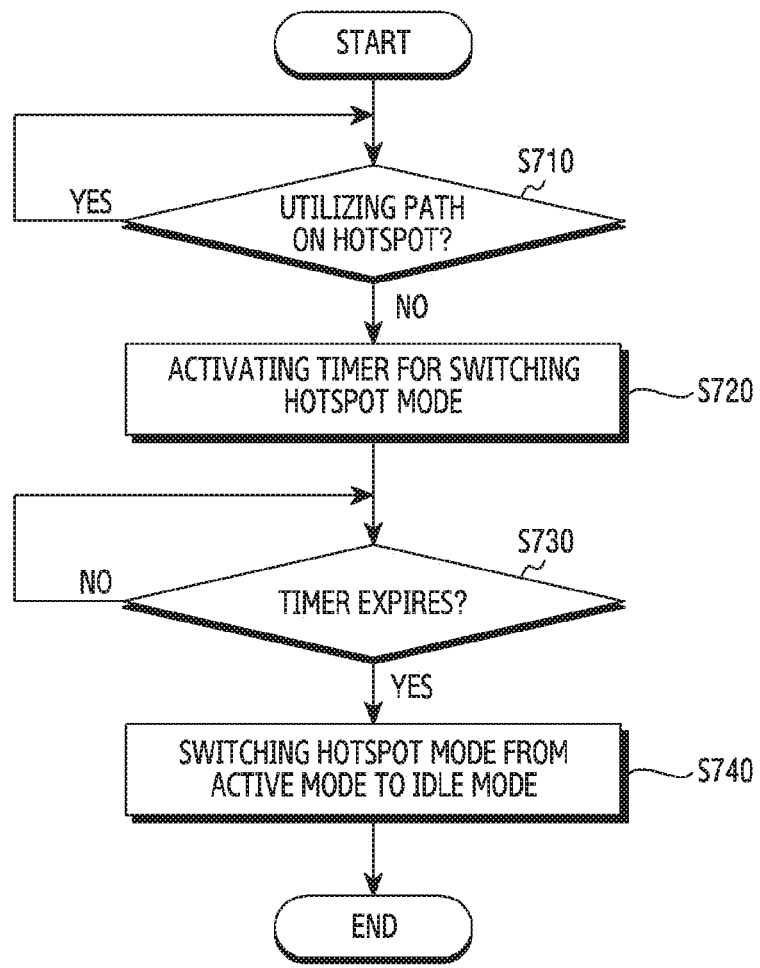
FIG. 7 illustrates an example of operational flows of a mobile AP which operates a timer.

FIG. 7 illustrates an example of operational flows of a mobile AP which operates a timer.

As shown in FIG. 7, in step S710, the mobile AP may determine (or detect) whether to utilize a path on a hotspot. The path on the hotspot may indicate the LP Wi-Fi connection. For example, the mobile AP may determine whether traffic (or user data, control information, etc.) is transmitted or received via the path on the hotspot. If the path on the hotspot is utilized, the mobile AP may repeat the operation of step S710. By contrast, if the path on the hotspot is not utilized, the mobile AP may repeat the operation of step S720.

In step S720, the mobile AP may activate a timer for switching a mode of the hotspot. The mobile AP may activate the timer for switching the hotspot mode, in order to switch the hotspot mode to the idle mode if the traffic transmission or reception does not occur during a designated period.

In step S730, the mobile AP may determine whether the timer expires. If the path on the hotspot is not used during the designated period (e.g., from the timer activation time to the expiration time), the mobile AP may perform the operation of step S740. By contrast, if the path on the hotspot is utilized within the designated period, the mobile AP may reset the timer, although not shown in FIG. 7. For example, if traffic is received or traffic to transmit is generated while activating the timer, the mobile AP may reset the timer. If the traffic reception or transmission finishes and the path on the hotspot is not re-used, the mobile AP may reactivate the reset timer.

In step S740, in response to the timer expiration, the mobile AP may switch the hotspot mode from the active mode to the idle mode. The mobile AP may switch the hotspot mode from the active mode to the idle mode, to reduce power consumption according to the hotspot service provision.

As stated above, the mobile AP may adaptively switch the hotspot mode using the timer, according to whether the hotspot provided by the mobile PA is utilized or whether the traffic moves along the path on the hotspot. Since an STA receiving the hotspot from the mobile AP may notify the mobile AP of traffic generation through the proximity communication path, the mobile AP may reduce the power consumption and continuously provide the service to the STA.

Figure 8:
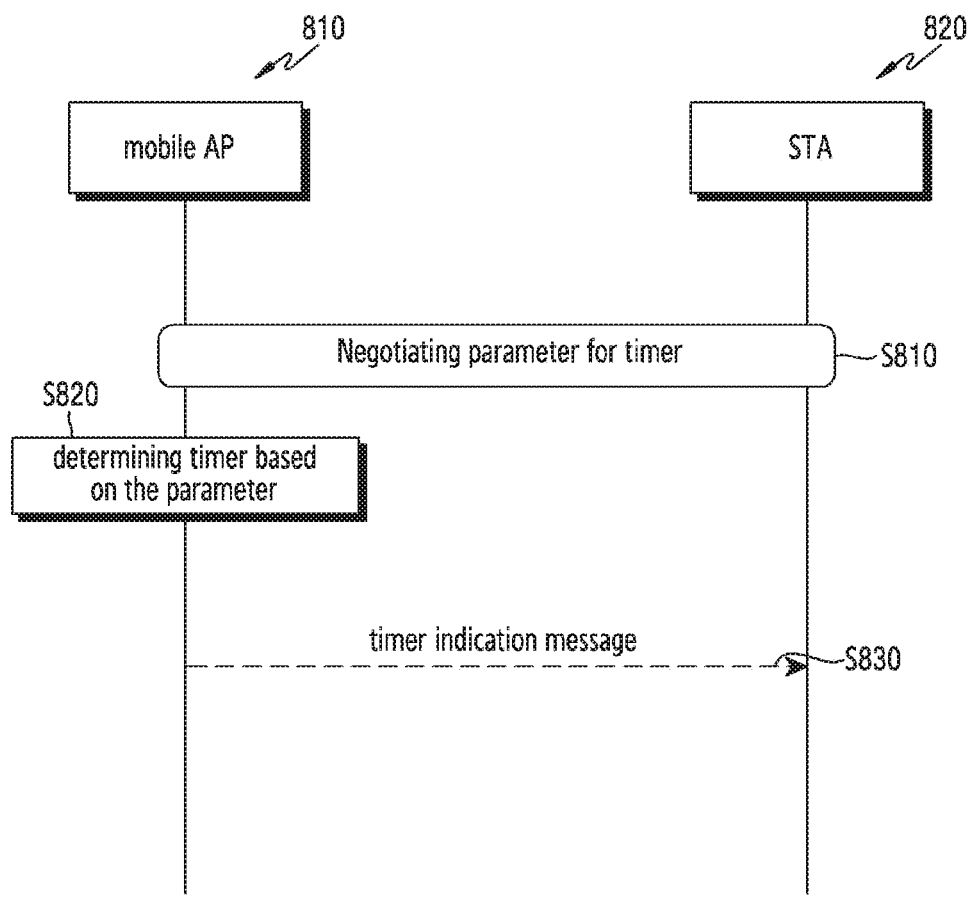
FIG. 8 illustrates an example of signal flows between a mobile AP and a station for determining a timer.

FIG. 8 illustrates an example of signal flows between a mobile AP and an STA for determining a timer.

As shown in FIG. 8, in step S810, a mobile AP 810 and an STA 820 may negotiate a parameter for the timer. In some embodiments, the mobile AP 810 may request the parameter for the timer from the STA 820 through a message having a format of various types. In some embodiments, to determine the timer, the mobile AP 810 may request the parameter for indicating a downlink status between the mobile AP 810 and the STA 820, from the STA 820 using the connection request message of step S326 of FIG. 3. In response to receiving the connection request message, the STA 820 may transmit a separate message including a measurement report to the mobile AP, through the proximity communication path or the path on the hotspot. In some other embodiments, the STA 820 may include and transmit uplink traffic type or format information of the STA 820 in the traffic indication message of step S210 of FIG. 2. For example, if uplink traffic of the STA 820 is related to a streaming service, the STA 820 may transmit a message for indicating that the uplink traffic is related to the streaming service, to the mobile AP, so that the mobile AP efficiently determines a length of the timer.

In step S820, the mobile AP 810 may determine the timer based on the parameter. For example, if the traffic is expected to be generated continually, the mobile AP 810 may relatively lengthen the length of the timer. For another example, if determining that the type of the traffic requires a short transmission period, the mobile AP 810 may control the length of the timer in response to the traffic type. As yet another example, the mobile AP 810 may determine the timer length based on a battery state (or a battery power state) of the mobile AP 810. Step S820 merely shows the example where the mobile AP 810 determines the timer, for the sake of explanations. According to embodiments, the STA 820 may determine and report the timer to the mobile AP 810 in operation of step S810.

In step S830, the mobile AP 810 may transmit a timer indication message including timer information to the STA 820, through the proximity communication path. In some embodiments, the timer indication message may be transmitted as a separate message to the STA 820 as shown in step S830. In some other embodiments, the timer indication message may be transmitted through a different message as shown in at least one of FIG. 2 through FIG. 6. In some other embodiments, the mobile AP 810 may transmit to the STA 820 information for deriving the timer, rather than direct information of the timer.

As stated above, the mobile AP 810 may adaptively determine the timer length for adaptively switching the hotspot mode, according to the negotiation procedure with the STA 820, the state of the mobile AP 810, and/or the state of the STA 820. With the variable length of the timer, the mobile AP 810 may efficiently reduce power consumption according to the hotspot service provision.

Figure 9:
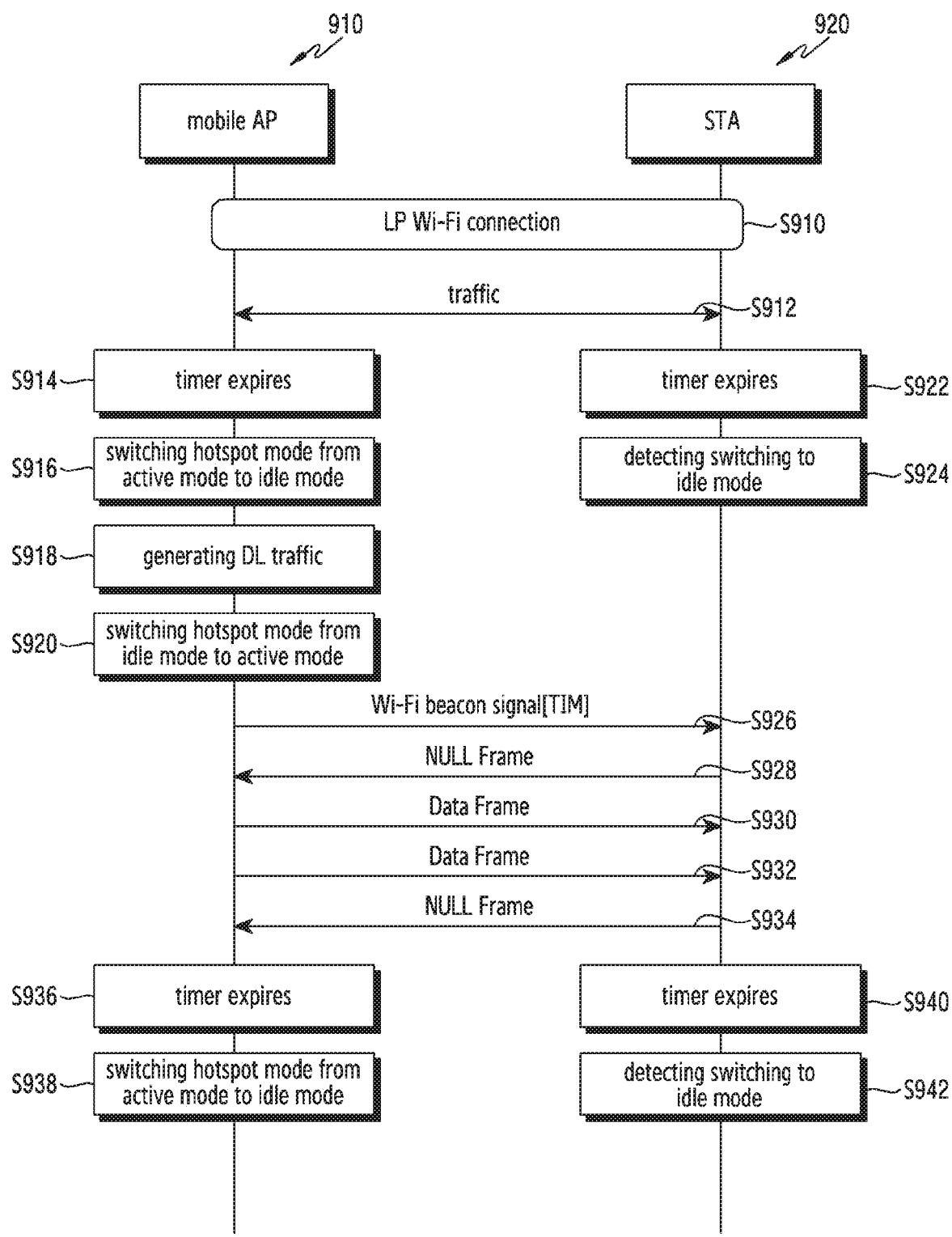
FIG. 9 illustrates an example of signal flows between a mobile AP and a station for switching a hotspot mode according to downlink traffic.

FIG. 9 illustrates an example of signal flows between a mobile P and an STA for switching a hotspot mode according to downlink traffic.

As shown in FIG. 9, in step S910, a mobile AP 910 and an STA 920 may generate an LP Wi-Fi connection. For example, the mobile AP 910 and the STA 920 may generate the LP Wi-Fi connection through the signal flows of FIG. 3, the signal flows of FIG. 4.

In step S912, the mobile AP 910 and the STA 920 may exchange traffic through the LP Wi-Fi connection. For example, the mobile AP 910 may transmit downlink traffic to the STA 920 via the LP Wi-Fi connection. In another example, the mobile AP 910 may receive uplink traffic from the STA 920 via the LP Wi-Fi connection.

If the traffic exchange finishes in step S912, the mobile AP 910 may activate the timer.

In step S914, the activated timer may expire. For example, if no traffic between the mobile AP 910 and the STA 920 is generated, the activated timer may expire.

In step S916, in response to the expiration of the timer, the mobile AP 910 may change the hotspot mode from the active mode to the idle mode. The mobile AP 910 may change the hotspot mode to the idle mode, to reduce power consumption according to hotspot provision.

Meanwhile, in step S922, the STA 920 may recognize that the timer expires. Since the STA 920 may detect the state of the timer of the mobile AP 910 through the timer indication message of step S830 of FIG. 8, the timer expiration may be detected. In some embodiments, the STA 910 may recognize the tinier expiration, by receiving a message indicating the timer expiration from the mobile AP 910.

In step S924, the STA 920 may detect that the mobile AP 910 switches the hotspot mode to the idle mode in response to the timer expiration. In other words, the STA 920 may recognize that the mobile AP 910 enters the idle mode in response to the timer expiration.

In step S918, the mobile AP 910 may generate (or receive from other peer) downlink traffic. For example, if data is provided from other peer associated with the STA 920 to the mobile AP 910 via a server or the mobile AP 910 has data to transmit to the STA 920, the mobile AP 910 may generate the downlink traffic.

In step S920, to transmit the generated downlink traffic to the STA 920, the mobile AP 910 may switch the hotspot mode from the idle mode to the active mode.

In step S926, the mobile AP 910 may broadcast (or transmit to the STA 920) a Wi-Fi beacon signal including a traffic indication map (TIM). In other words, the mobile AP 910 may transmit the Wi-Fi beacon signal including the TIM to the STA 920, to indicate presence of downlink traffic to transmit.

In step S928, the STA 920 may transmit a null frame to the mobile AP 910. The STA 920 may transmit the null frame to the mobile AP 910, to request downlink traffic indicated by the TIM.

In steps S930 and S932, the mobile AP 910 may transmit a data frame to the STA 920. Although not depicted in FIG. 9, the mobile AP 910 may reset the timer for every data frame transmission to the STA 920. In addition, the STA 920 may reset the tinier every time a data frame is received from the mobile AP 910.

In step S934, the STA 920 may transmit a null frame to the mobile AP 910 to identify whether there is a remaining data frame. According to embodiments, the STA 920 may transmit the null frame to the mobile AP 910 to indicate that information regarding the data frame is successfully received.

When the downlink traffic transmission is finished, the mobile AP 910 and the STA 920 may not use the LP Wi-Fi connection. The mobile AP 910 may activate the timer in response to not using the LP Wi-Fi connection.

In step S936, the activated timer may expire. Also, in step S940, the STA 920 may recognize that the activated timer expires.

In step S938, in response to the activated timer expiration, the mobile AP 910 may switch the hotspot mode from the active mode to the idle mode. Meanwhile, in step S942, the STA 920 may detect that the hotspot mode of the mobile AP 910 is switched to the idle mode.

As stated above, the mobile AP 910 and the STA 920 may perform the adaptive PSM and the adaptive mode switch. Through the adaptive PSM and the adaptive mode switch, even if downlink traffic is generated, the mobile AP 910 may reduce power consumption according to the hotspot service, without interrupting the hotspot service.

Figure 10:
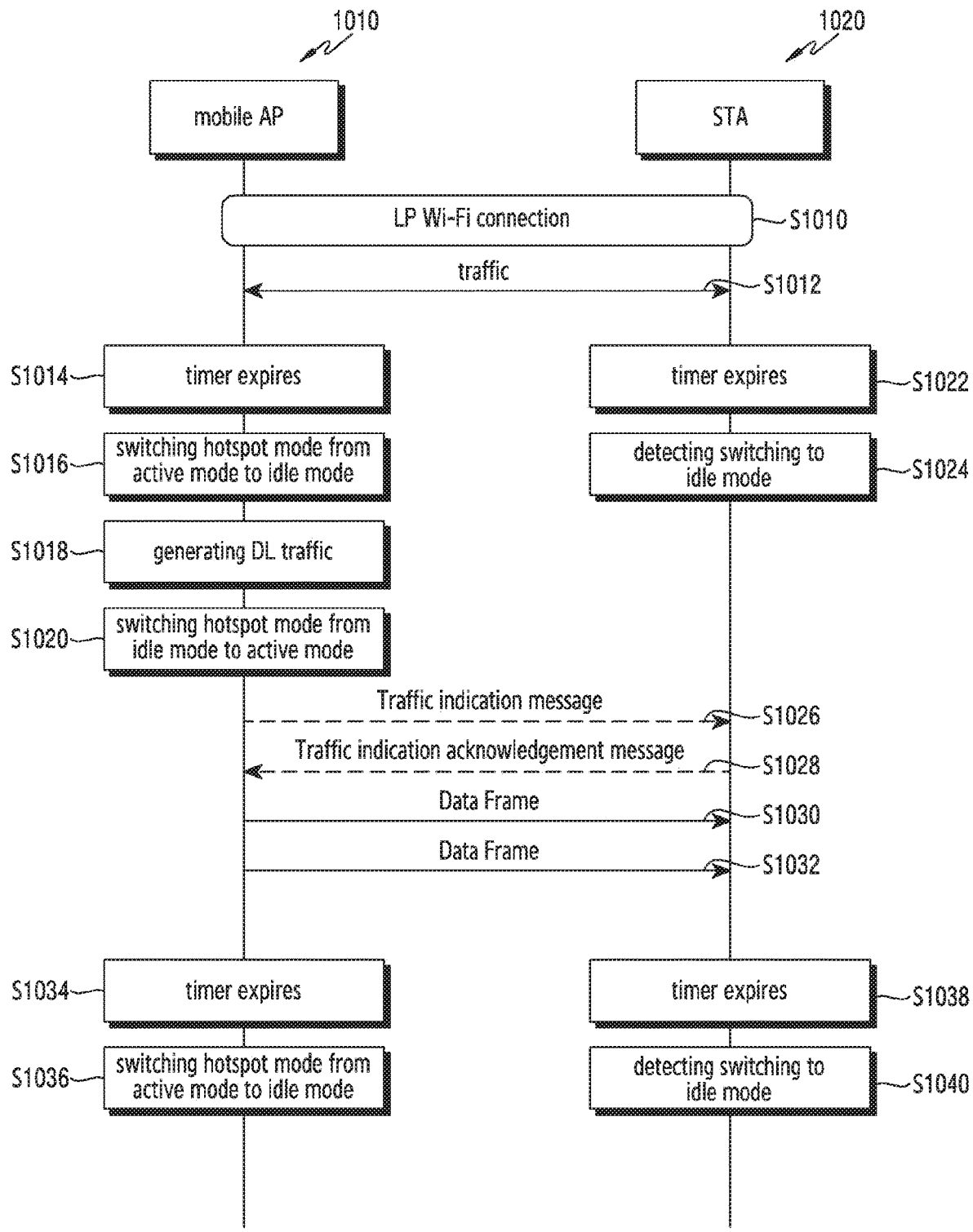
FIG. 10 illustrates another example of signal flows between a mobile AP and a station for switching a hotspot mode according to downlink traffic.

FIG. 10 illustrates another example of signal flows between a mobile AP and an STA for switching a hotspot mode according to downlink traffic.

As shown in FIG. 10, in step S1010, a mobile AP 1010 and an STA 1020 may generate an LP Wi-Fi connection. In addition, the mobile AP 1010 and the STA 1020 may perform an operation of step S1012, as in the operation of step S912.

The mobile AP 1010 may perform the same or similar operations to S914, S916, S918, and S920 in S1014, S1016, S1018, and S1020 respectively.

Meanwhile, the STA 1020 may perform the same or similar operations to S922 and S924 in S1022 and S1024 respectively.

In step S1026, the mobile AP 1010 may transmit the traffic indication messages to the STA 1020, via the proximity communication path. The traffic indication message may be a message for indicating presence of downlink traffic to be transmitted from the mobile AP 1010. The traffic indication message may be a message for notifying to switch the state of the STA 1020 to the wake-up state or the active state. In some embodiments, the traffic indication message may further include length information of the timer.

In step S1028, in response to receiving the traffic indication message transmitted from the mobile AP 1010, the STA 1020 may transmit a traffic indication acknowledgement message to the mobile AP 1010 via the proximity communication path. The traffic indication acknowledgement message may be a message for indicating that the STA 1020 recognizes that the hotspot mode of the mobile AP 1010 is switched to the active mode. The traffic indication acknowledgement message may be a message for indicating that the STA 1020 is ready to receive downlink traffic from the mobile AP 1010.

The mobile AP 1010 in step S1030 and step S1032 may, in response to receiving the traffic indication acknowledgement message, transmit a data frame to the STA 1020 via the path on the hotspot. In other words, the mobile AP 1010 may transmit the downlink traffic, as the data frame, to the STA 1020.

If the transmission of the downlink traffic finishes, the mobile AP 1010 may activate the timer. In some embodiments, the mobile AP 1010 may transmit a message for informing that the timer is to be activated, to the STA 1020. In some other embodiments, the mobile AP 1010 may transmit downlink traffic to finally transmit by including information for indicating that the use of the timer is to be initiated. In some other embodiments, the mobile AP 1010 may activate the timer from a preset timing. In this case, the STA 1020 may recognize the activation timing of the timer from the preset timing.

In step S1034, the timer may expire. Meanwhile, in step S1038, the STA 1020 may recognize (or detect) the timer expiration. In some embodiments, the STA 1020 may recognize the timer expiration from a timer expiration message received from the mobile AP 1010.

In step S1036, the mobile AP 1010 may, in response to the timer expiration, switch the hotspot mode from the active mode to the idle mode. Also, in step S1040, the STA 1020 may detect that the hotspot mode of the mobile AP 1010 is switched to the idle mode, based on the detection of the tinier expiration.

Unlike FIG. 9, FIG. 10 illustrates the process for notifying the presence of the downlink traffic via the proximity communication path. Through the above-described signal flows of step S1010 through step S0140, the mobile AP 1010 may efficiently manage the power of the mobile AP 1010.

Meanwhile, a similar process to the procedure of FIG. 10 may be performed on uplink traffic. For example, if uplink traffic to transmit is generated, the STA 1020 may transmit a message (i.e., a traffic indication message) indicative of the uplink traffic to the mobile AP 1010 via the proximity communication path. The mobile AP 1010 may, in response to receiving the traffic indication message, transmit the traffic indication acknowledgement message to the STA 1020 via the proximity communication path. Through the traffic indication acknowledgement message, the STA 1020 may recognize that the mobile AP 1010 is changed to the active mode. The STA 1020 may transmit the uplink traffic to the mobile AP 1010 of the active mode.

Figure 11:
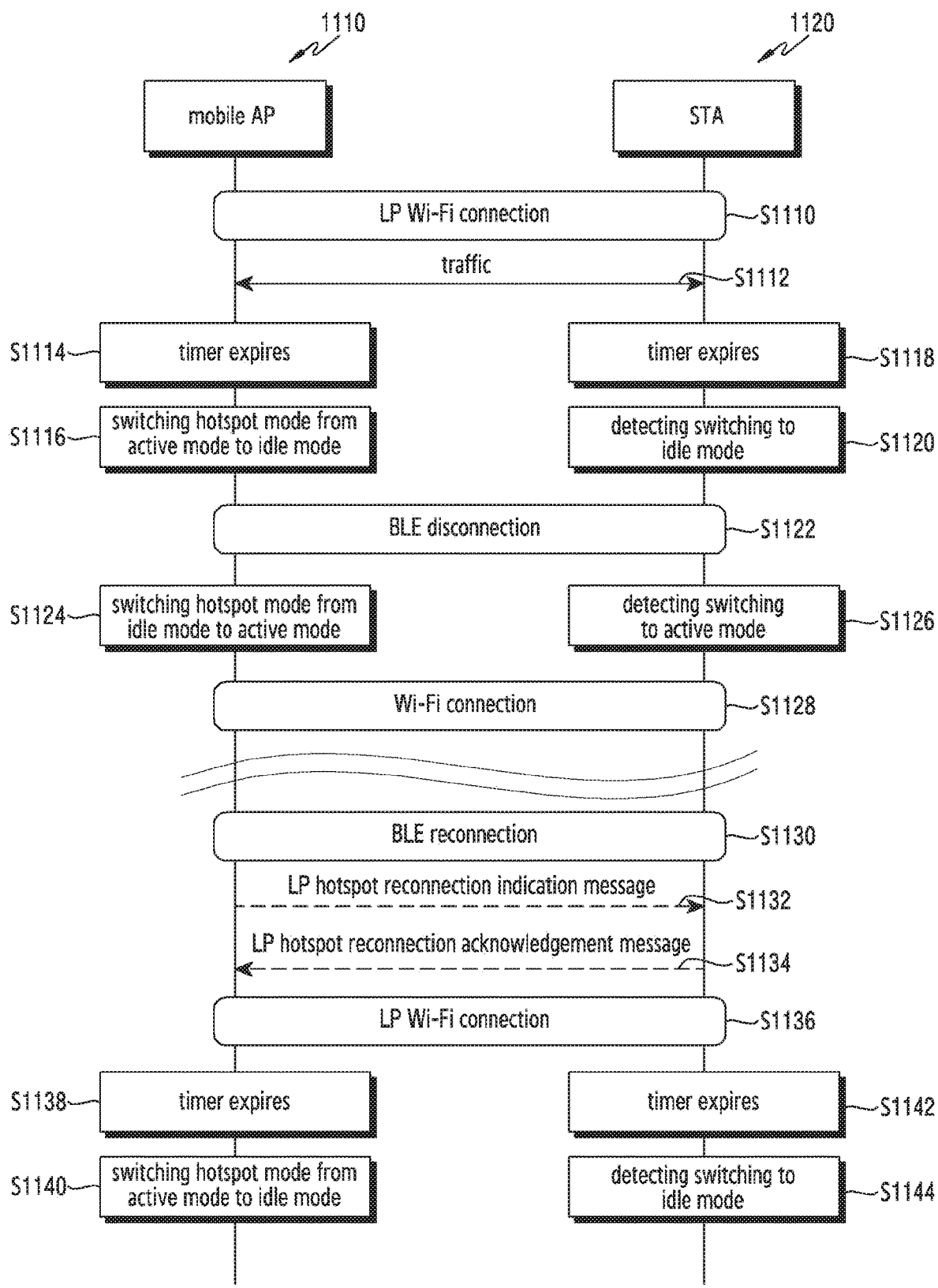
FIG. 11 illustrates an example of signal flows between a mobile AP and a station if proximity communication is disconnected.

FIG. 11 illustrates an example of signal flows between a mobile AP and an STA if proximity communication is disconnected.

As shown in FIG. 11, in step S1110, a mobile AP 1110 and an STA 1120 may generate (or establish) an LP Wi-Fi connection. Also, in step S1112, the mobile AP 1110 and the STA 1120 may transmit and receive traffic via the LP Wi-Fi connection.

If the transmission and reception of the traffic is completed and the LP Wi-Fi connection is not used, the mobile AP 1110 may initiate the operation of the timer. The timer may be reset in response to traffic generation.

In step S1114, the timer may expire. In addition, in step S1118, the STA 1120 may recognize that the timer expires. In some embodiments, the STA 1120 may detect the timer expiration of the mobile AP 1110 through timer expiration of the STA 1120 corresponding to the timer. In some other embodiments, the STA 1120 may detect the timer expiration of the mobile AP 1110 from a timer expiration notification message received from the mobile AP 1110.

In step S1116, the mobile AP 1110 may switch the hotspot mode from the active mode to the idle mode. The mobile AP 1110 may switch the hotspot mode to the idle mode, to reduce power consumption due to the hotspot.

Meanwhile, in step S1120, the STA 1120 may detect that the mobile AP 1110 switches to the idle mode based on information of the timer expiration of the mobile AP 1110.

In step S1122, BLE (proximity communication connection) connection between the mobile AP 11110 and the STA 1120 may be disconnected. For example, if a distance between the STA 1120 and the mobile AP 1110 exceeds a BLE communication available distance, the BLE connection between the mobile AP 1110 and the STA 1120 may be disconnected.

In step S1124, in response to the BLE disconnection to assist the LP hotspot, the mobile AP 1110 may switch the hotspot mode from the idle mode to the active mode. In step S1126, the STA 1120 may detect that the hotspot mode of the mobile AP 1110 is switched to the active mode based on the BLE disconnection. If the BLE connection is disconnected, the mobile AP 1110 and the STA 1120 may not notify presence or generation of traffic to the other in the idle mode. Thus, in response to the BLE disconnection, the mobile AP 1110 may switch the hotspot mode to the active mode.

In step S1128, the mobile AP 1110 and the STA 1120 may generate a normal Wi-Fi connection, rather than the LP Wi-Fi connection. The generation of the normal Wi-Fi connection may be a process to supplement the BLE disconnection.

In step S1130, the mobile AP 1110 and the STA 1120 may perform BLE reconnection. For example, if the mobile AP 1110 and the STA 1120 have an adequate distance for the BLE connection, the mobile AP 1110 and the STA 1120 may perform the BLE reconnection.

In step S1132, the mobile AP 1110 may transmit an LP hotspot reconnection indication message, to the STA 1120 via the proximity communication path (or the BLE connection). The LP hotspot reconnection indication message may be a message for indicating that the mobile AP 1110 is able to execute an operation associated with the LP hotspot to the STA 1120. In some embodiments, the mobile AP 1110 may transmit the LP hotspot reconnection indication message including information of the timer (or update information of the timer) to the STA 1120.

In step S1134, the STA 1120 may transmit an LP hotspot reconnection acknowledgement message to the mobile AP 1110 through the proximity communication path. The LP hotspot reconnection acknowledgement message may be a message for indicating that the STA 1120 successfully receives the LP hotspot reconnection indication message.

In step S1136, the mobile AP 1110 and the STA 1120 may regenerate the LP Wi-Fi connection. For example, the mobile AP 1110 may regenerate the LP Wi-Fi connection with the STA 1120 using the LP tethering client table. In another example, the mobile AP 1110 and the STA 1120 may regenerate the LP Wi-Fi connection through the signal flows of FIG. 4, Since the LP Wi-Fi connection is regenerated, if the LP Wi-Fi connection is not used, the timer may expire as in step S1138. Further, the STA 1120 may detect the timer expiration, in step S1112.

In step S1140, the mobile AP 1110 may switch the hotspot mode from the active mode to the idle mode in response to the timer expiration. Further, in step S1144, the STA 1120 may detect that the hotspot mode of the mobile AP 1110 is switched to the idle mode.

As stated above, if the LP Wi-Fi connection may not be maintained due to the BLE disconnection (or the disconnection of the proximity communication), the mobile AP 1110 may switch the LP Wi-Fi connection to the normal Wi-Fi connection. The mobile AP 1110 may change not only the hotspot mode but also the Wi-Fi connection type according to a communication state, to thus maintain stability of the connection.

Figure 12:
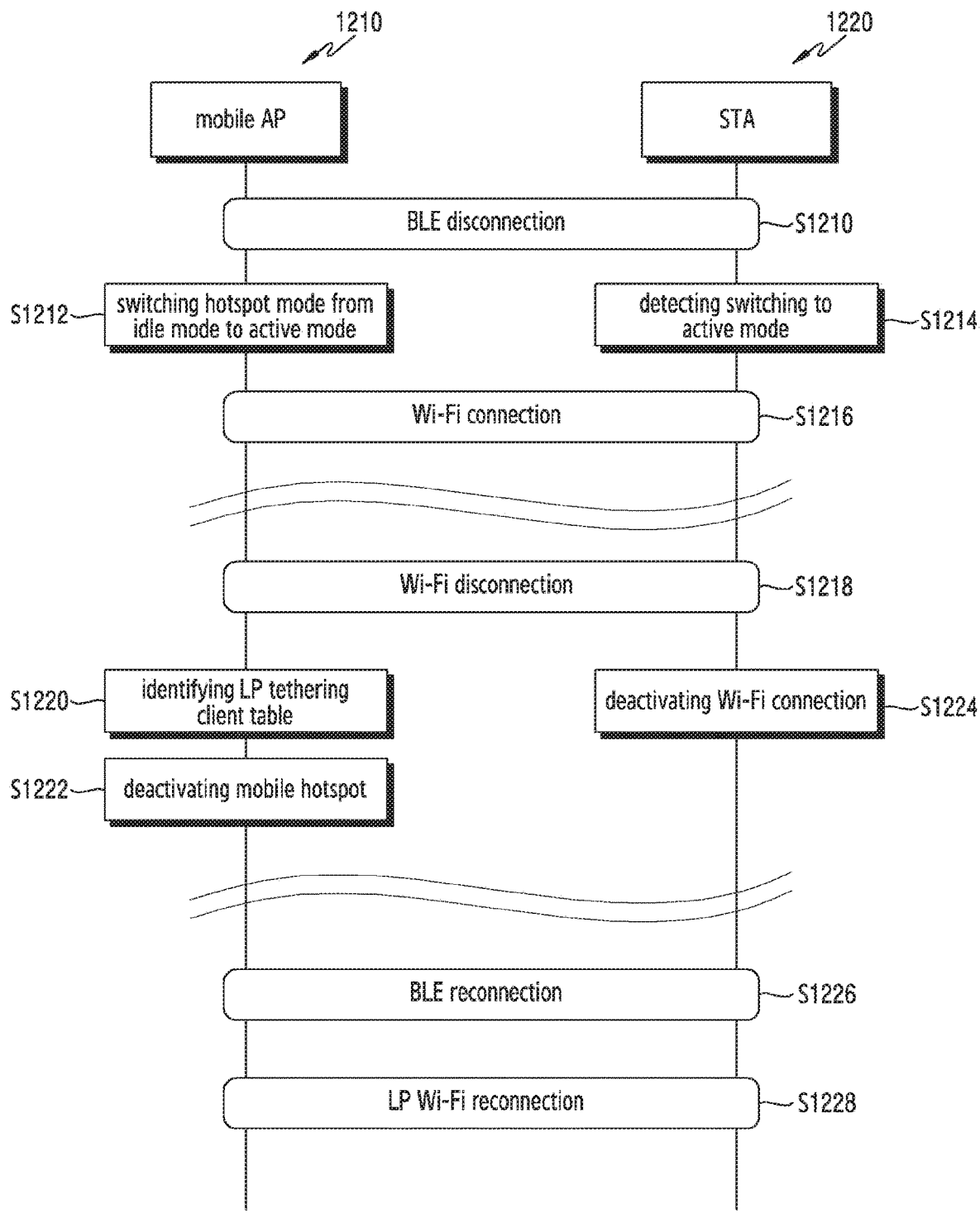
FIG. 12 illustrates an example of signal flows between a mobile AP and a station if normal Wi-Fi communication is disconnected.

FIG. 12 illustrates an example of signal flows between a mobile AP and an STA if normal Wi-Fi communication is disconnected.

As shown in FIG. 12, in step S1210, BLE disconnection may occur between a mobile AP 1210 and an STA 1220. For example, if the BLE of at least one of the mobile AP 1210 and the STA 1220 is deactivated or a distance between the mobile AP 1210 and the STA 1220 is longer than a BLE communication range, the BLE disconnection may occur between the mobile AP 1210 and the STA 1220.

As aforementioned, in response to the BLE disconnection, in step S1212, the mobile AP 1210 may switch the hotspot mode from the idle mode to the active mode. In addition, the STA 1220 may detect the mode switch of the mobile AP 1210.

Further, as in step S1128 of FIG. 11, in step S1216, the mobile AP 1210 and the STA 1220 may generate a Wi-Fi connection.

In step S1218, the Wi-Fi connection between the mobile AP 1210 and the STA 1220 may be lost (or disconnected). For example, if a connection between the mobile AP 1210 and a base station which provides a cellular network service is disconnected, the Wi-Fi connection between the mobile AP 1210 and the STA 1220 may be disconnected. For another example, if the STA 1220 leaves a hotspot range of the mobile AP 1210, the Wi-Fi connection between the mobile AP 1210 and the STA 1220 may be disconnected.

In step S1220, the mobile AP 1210 may identify the LP tethering client table. If determining no STA accessing the mobile AP 1210 as a result of identifying the LP tethering client table, the mobile AP 1210 may deactivate the mobile hotspot in step S1222. That is, if there are no STAs connected to the mobile AP, the mobile AP 1210 may deactivate the mobile hotspot in order to reduce power consumption according to the hotspot service provision. However, the mobile AP 1210 does not deactivate the BLE to regenerate the LP Wi-Fi connection with the STA 1220.

In step S1226, the STA 1220 may perform BLE reconnection with the mobile AP 1210 in response to the access of the STA 1220. Also, in step S1228, based on the BLE reconnection, the STA 1220 and the mobile AP 1210 may perform LP Wi-Fi reconnection.

As stated above, the mobile AP 1210 does not deactivate the BLE function, for the LP Wi-Fi connection. Through this operation, the mobile AP 1210 may stop providing the unnecessary hotspot service if the hotspot is not used due to the disconnection.

Figure 13:
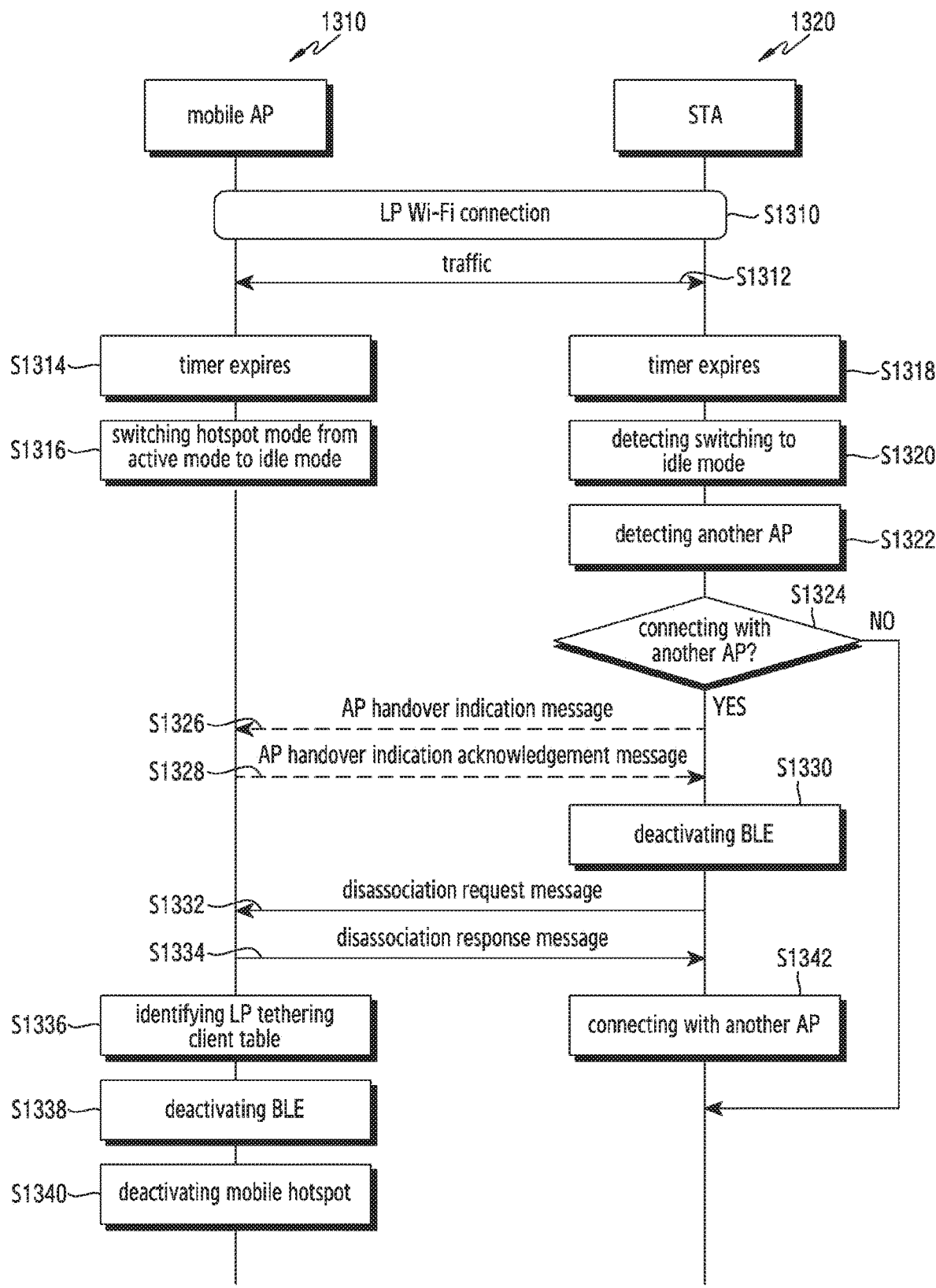
FIG. 13 illustrates an example of signal flows between a station which hands over from a mobile AP to another AP and the mobile AP.

FIG. 13 illustrates an example of signal flows between an STA which hands over from a mobile AP to another AP and the mobile AP.

As shown in FIG. 13, in step S1310, a mobile AP 1310 and an STA 1320 may generate an LP Wi-Fi connection. In addition, in step S1312, the mobile AP 1310 and the STA 1320 may exchange traffic via the LP Wi-Fi connection.

The timer may expire in step S1314, and the STA 1320 may recognize the timer expiration in step S1318.

In step S1316, in response to the timer expiration, the mobile AP 1310 may switch the hotspot mode from the active mode to the idle mode. Also, in step S1320, the STA 1320 may recognize that the hotspot mode of the mobile AP 1310 is the idle mode.

Meanwhile, in step S1322, the STA 1320 may detect another AP. For example, if a user possessing the user STA 1320 approaches a public AP such as a store or a subway, the STA 1320 may detect the another AP. In other words, the STA 1320 may detect the another AP based on a Wi-Fi beacon signal transmitted (or broadcast) by the another AP.

In step S1324, the STA 1320 may determine whether to connect the another AP. For example, if determining that the another AP provides a service of higher capability or determining that a link quality between the another AP and the STA 1320 is better, the STA 1320 may determine to connect the another AP, rather than the mobile AP 1310. If determining to connect the another AP, the STA 1320 may perform the operation in step S1326. By contrast, if determining not to connect the another AP, the STA 1320 may stop (or terminate) an operation associated with the another AP.

In step S1326, for the connection with the another AP, the STA 1320 may transmit an AP handover indication message to the mobile AP 1310, via the proximity communication path.

In step S1328, in response to receiving the AP handover indication message, the mobile AP 1310 may transmit an AP handover indication acknowledgement message to the STA 1320 through the proximity communication path.

In step S1330, the STA 1320 may perform BLE disconnection for the mobile AP 1310. The STA 1320 may perform the BLE disconnection, based on determining that there is no need to maintain the BLE connection to assist the LP Wi-Fi connection. According to embodiments, the STA 1320 may not perform the BLE disconnection. For example, if the STA 1320 is located in a communication environment which rapidly changes, the STA 1320 may not perform the BLE disconnection, for a subsequent connection. In this case, the STA 1320 performs connection to the another AP, but may transmit to the mobile AP 1310 a message indicating that the BLE connection is maintained.

In step S1332, the STA 1320 may transmit a disassociation request message to the mobile AP 1310, for the handover to the another AP.

In step S1334, in response to receiving the disassociation message, the mobile AP 1310 may transmit a disassociation response message to the STA 1320.

In step S1342, the STA 1320 may connect to the another AP, in response to receiving the disassociation response message.

Meanwhile, in step S1336, the mobile AP 1310 may identify the LP tethering client table, to identify whether other STA is connected.

If there is no STA connected to the mobile AP 1310 as a result of identifying the LP tethering client table, the mobile AP 1310 may deactivate a BLE function in step S1338.

In addition, in step S1340, the mobile AP 1310 may deactivate a mobile hotspot function.

As stated above, the mobile AP 1310 may process the handover process of the connected STA regardless of the hotspot mode (particularly, in the idle mode) of the mobile AP 1310 via the proximity communications path. The mobile AP 1310 may provide a stable service through such signal flows or operational procedure.

Figure 14:
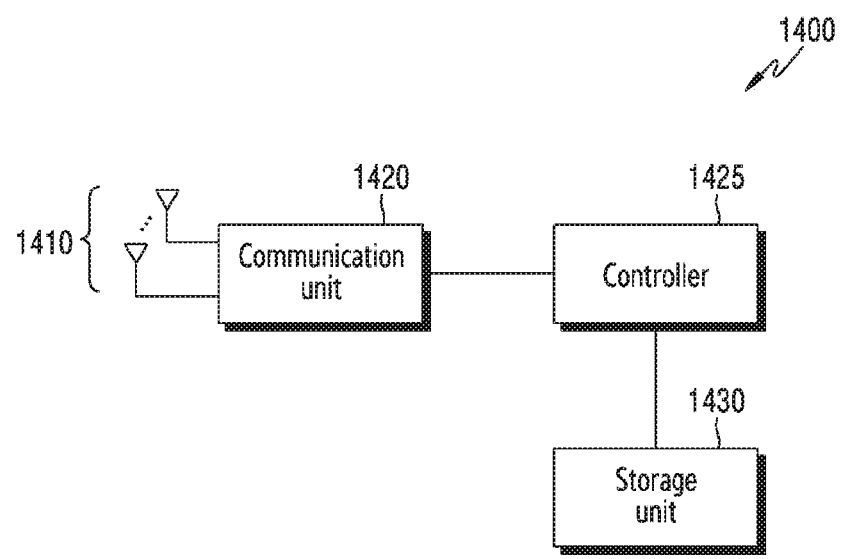
FIG. 14 illustrates an example of a functional configuration of a device associated with a LP hotspot.

FIG. 14 illustrates an example of a functional configuration of a device associated with an LP hotspot.

The functional configuration may be included in any one of the mobile AP and the STA as shown in FIG. 1 through FIG. 13.

As shown in FIG. 14, a device 1400 may include an antenna 1410, a communication unit 1420, a controller 1425, and a storage unit 1430.

The antenna 1410 may include one or more antennas. The antenna 1410 may be configured for multiple input multiple output (MEMO) technique.

The communication unit 1420 may perform functions for transmitting or receiving a signal over a radio channel.

The communication unit 1420 may perform conversion functions between a baseband signal and a bit string according to a physical layer standard of a system. For example, if transmitting data, the communication unit 1420 may generate complex symbols by encoding and modulating a transmit bit string. For another example, if receiving data, the communication unit 1420 may restore a receive bit string by demodulating and decoding a baseband signal.

The communication unit 1420 may up-convert and transmit a baseband signal into a radio frequency (RF) band signal via the antenna 1410. The communication unit 1420 may down-convert an RF band signal received via the antenna 1410 into a baseband signal. For example, the communication unit 1420 may include a transmit filter, a receive filter, an amplifier, a mixer, an oscillator, a digital analog converter (DAC), an analog digital converter (ADC), and the like.

The communication unit 1420 may include a proximity communication unit and a Wi-Fi communication unit. For example, the proximity communication unit may include a Bluetooth chipset, and the Wi-Fi communication unit may include a Wi-Fi chipset.

The communication unit 1420 may be operatively coupled to the controller 1425.

The communication unit 1420 may be implemented with at least one transceiver.

The controller 1425 may control the general operations of the device 1400. For example, the controller 1425 may transmit or receive a signal through the communication unit 1420. The controller 1425 may record data in the storage unit 1430, and read data recorded in the storage unit 1430. For doing so, the controller 1425 may include at least one processor. For example, the controller 1425 may include a communication processor (CP) for controlling the communication and an application processor (AP) for controlling an upper layer such as application program.

The storage unit 1430 may store control command code, control data, or user data for controlling the device 1400. For example, the storage unit 1430 may include an application, an operating system (OS), middleware, a device driver.

The storage unit 1430 may include at least one of a volatile memory or a non-volatile memory. The volatile memory may include a dynamic random access memory (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), and so on. The non-volatile memory may include a read only memory (ROM), a programmable ROM (PROM), an electrically programmable ROM (EPROM), an electrically erasable ROM (EEPROM), a flash memory, and the like.

The storage unit 1430 may include a non-volatile medium such as a hard disk drive (MD), a solid state disk (SSD), an embedded multi media card (eMMC), and a universal flash storage (UFS).

The storage unit 1430 may be operatively coupled to the controller 1425.

Figure 15:
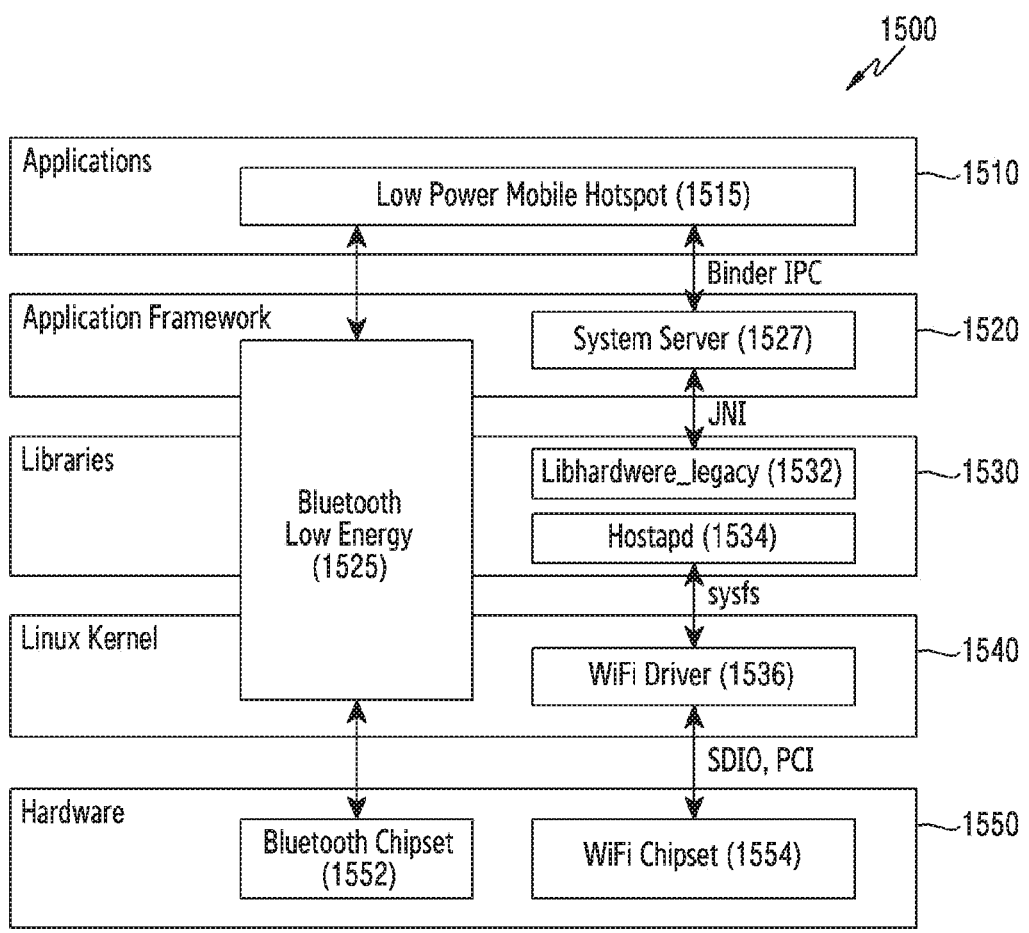
FIG. 15 illustrates an example of a block configuration between software and hardware of a mobile AP.

FIG. 15 illustrates an example of a block configuration between software and hardware of a mobile AP.

This block configuration may be included in any one of the mobile AP as shown in FIG. 1 through FIG. 13.

As shown in FIG. 15, a mobile AP 1500 may include applications 1510, an application framework 1520, libraries 1530, Linux kernel 1540, and/or hardware 1550.

The applications 1510 may include a low power mobile hotspot application 1515. The low power mobile hotspot application 1515 may control information for assisting the LP Wi-Fi connection between the mobile AP 1500 and other STA. For example, the low power mobile hotspot application 1515 may exchange signals and data with a Bluetooth chipset 1552 of the hardware 1550 through Bluetooth low energy. For example, if the mobile AP 1500 transmits a connection request message or a traffic indication message via the proximity communication path, the low power mobile hotspot application 1515 may exchange a signal or data regarding the connection request message or the traffic indication message with the Bluetooth low energy 1525 and/or the Bluetooth chipset 1552. In addition, the low power mobile hotspot application 1515 may perform the overall procedure related to the mobile AP 1500 and/or the STA. For example, the low power mobile hotspot application 1515 may perform registration of the mobile AP 1500 and the STA, access of the STA, and the handover procedure of the STA.

A Hostpad 1534 of the libraries 1530 and a Wi-Fi driver 1536 of the Linux kernel 1540 may control the Wi-Fi chipset 1554 of the hardware 1550. For example, the Wi-Fi driver 1536 and the Hostpad 1534 may provide a signal or data regarding the LP Wi-Fi connection to the Wi-Fi chipset 1554.

Figure 16:
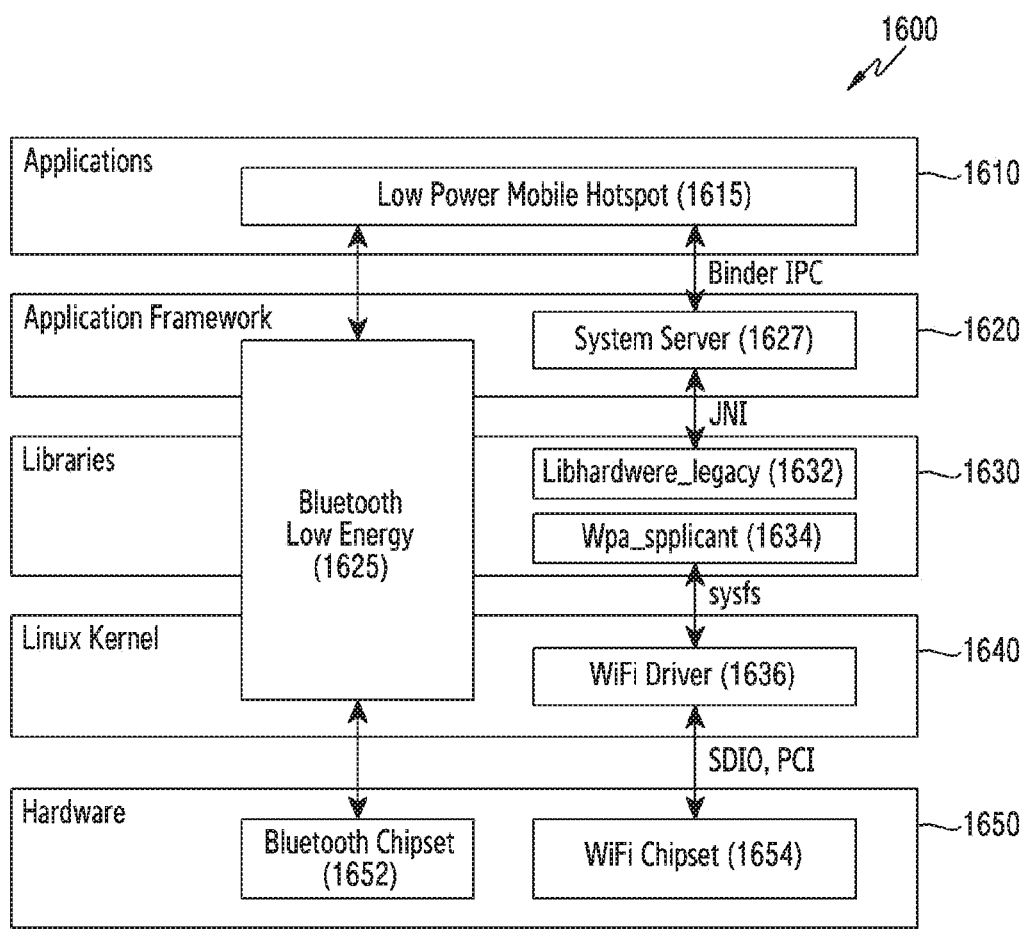
FIG. 16 illustrates an example of a block configuration between software and hardware of a station.

FIG. 16 illustrates an example of a block configuration between software and hardware of an STA.

This block configuration may be included in any one of the STAs as shown in FIG. 1 through FIG. 13.

As shown in FIG. 16, an STA 1600 may include applications 1610, an application framework 1620, libraries 1630, a linux kernel 1640, and/or hardware 1650.

A system server 1627 of the application framework 1620 may monitor whether the STA 1600 transmits data to a network. For example, if the STA 1600 transmits uplink traffic to the mobile AP, the system server 1627 may monitor the uplink traffic.

A low power mobile hotspot application 1615 of the applications 1610 may exchange Wi-Fi information and/or traffic information with the mobile AP via the proximity communication such as BLE. In addition, the low power mobile hotspot application 1615 may perform the overall procedure associated with the mobile AP. For example, the low power mobile hotspot application 1615 may perform registration of the mobile AP and the STA 1600, access of the STA 1600, and the handover procedure of the STA 1600.

Figure 17:
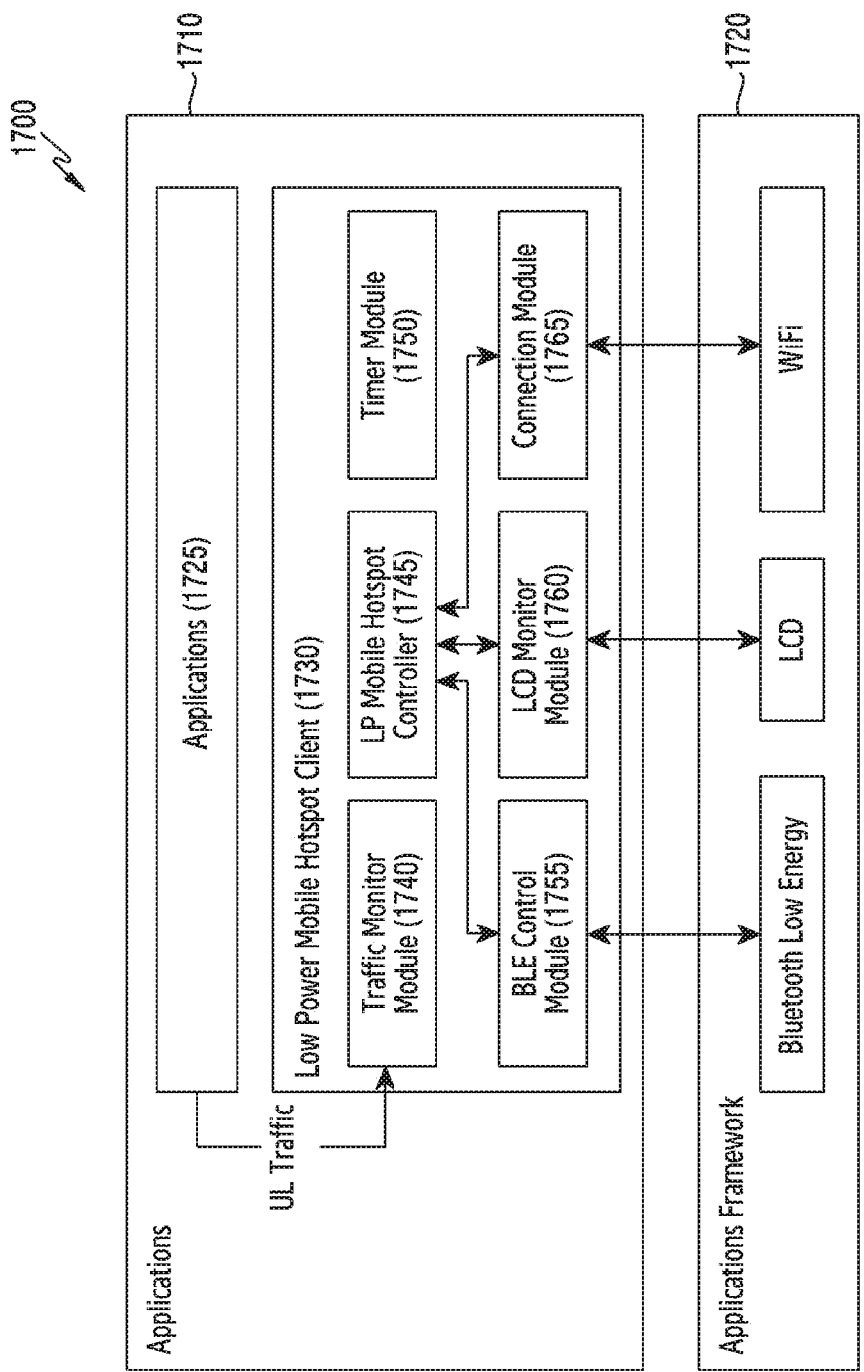
FIG. 17 illustrates an example of a block configuration of software of a station.

FIG. 17 illustrates an example of a block configuration of software of an STA.

This block configuration may be included in any one of the STAs as shown in FIG. 1 through FIG. 13.

As shown in FIG. 17, an STA 1700 may include applications 1710 and an application framework 1720.

The applications 1710 may include other applications 1725 installed on the STA 1700 and a low power mobile hotspot client application 1730.

A traffic monitor module 1740 of the low power mobile hotspot client application 1730 may monitor whether traffic is generated at the STA 1700. The traffic monitor module 1740 may identify a format or type of the monitored traffic.

The traffic monitor module 1740 may provide information regarding the detected traffic and/or information regarding the identified traffic type to an LP mobile hotspot controller 1745 of the low power mobile hotspot client application 1730.

The LP mobile hotspot controller 1745 may be a unit which controls registration of a mobile AP associated with the STA 1700, access of the mobile AP, and so on.

A timer module 1750 of the low power mobile hotspot client application 1730 may determine the timer. The timer module 1750 may determine the timer based on information received from the LP mobile hotspot controller or the traffic monitor module 1740. For example, the timer module 1750 may determine the length value of the timer based on the received information.

A BLE control module 1755 of the low power mobile hotspot client application 1730 may control the BLE connection with the mobile AP, through BLE of the application framework 1720. For example, the BLE control module 1755 may, for the LP Wi-Fi connection, control the BLE connection with the mobile AP through the BLE of the application framework 1720.

An LCD monitor module 1760 of the low power mobile hotspot client application 1730 may monitor a state of a display included of the STA 1700, through a liquid crystal display (LCD) of the application framework 1720. For example, the LCD monitor module 1760 may monitor whether power of the display of the STA 1700 is ON or OFF. While the STA 1700 utilizes the LCD as the display in FIG. 17, various displays may be applied to the STA 1700. For example, the STA 1700 may include a display based on light emitting diode (LED).

A connection module 1765 of the low power mobile hotspot client application 1730 may control the Wi-Fi connection of the STA 1700, through Wi-Fi of the application framework 1720. For example, the connection module 1765 may control the LP Wi-Fi connection between the mobile AP and the STA 1700.

As stated above, a method of a mobile AP in a wireless environment may include receiving a message for indicating presence of uplink traffic, from a station, via a proximity communication path, in response to receiving the message, switching a mode of a hotspot from an idle mode to an active mode, in response to switching to the active mode, transmitting a response message for the message to the station, via the proximity communication path, and receiving the uplink traffic from the station, via a path on the hotspot. In some embodiments, the method of the mobile AP may further include, if the reception of the uplink traffic is completed, activating a timer for switching the hotspot mode, and if the activated timer expires, switching the hotspot mode from the active mode to the idle mode. Also, the timer may be shared with the station, and determined according to a traffic type associated with at least one of the station d the mobile AP. In some other embodiments, the timer may be determined according to a power state of a battery of the mobile AP.

Also, in some other embodiments, the operating method of the mobile AP may further include, in response to identifying downlink traffic to the station, switching the hotspot mode from the idle mode to the active mode, in response to switching to the active mode, transmitting a message for indicating a presence of downlink traffic, to the station, via the proximity communication path, and if receiving a response message for the message for indicating the presence of the downlink traffic, from the station, via the proximity communication path, transmitting the downlink traffic to the station, via the path on the hotspot.

Also, in some other embodiments, the path on the hotspot may be generated based on information regarding use of the hotspot transmitted to the station, via the proximity communication path.

Also, in some other embodiments, the operating method of the mobile AP may further include, if another station which does not support the idle mode accesses via another path on the hotspot, switching the hotspot mode from the idle mode to the active mode.

In addition, an apparatus of a mobile AP in a wireless environment may include a controller, a proximity communication unit operatively coupled to the controller, and a WLAN communication unit operatively coupled to the controller, wherein the controller may be configured to receive a message for indicating presence of uplink traffic, from a station, via a proximity communication path, in response to receiving the message, switch a mode of a hotspot from an idle mode to an active mode, in response to switching to the active mode, transmit a response message for the message to the station, via the proximity communication path, and receive the uplink traffic from the station, via a path on the hotspot. In some embodiments, the controller may, if the reception of the uplink traffic is completed, activate a timer for switching the hotspot mode, and if the activated timer expires, switch the hotspot mode from the active mode to the idle mode. Also, in some embodiments, the timer may be shared with the station, and determined according to a traffic type associated with at least one of the station and the mobile AP. In some other embodiments, the timer may be determined according to a power state of a battery of the mobile AP.

Also, in some other embodiments, the controller may be further configured to, in response to identifying downlink traffic to the station, switch the hotspot mode from the idle mode to the active mode, in response to switching to the active mode, transmit a message for indicating a presence of downlink traffic, to the station, via the proximity communication path, and if receiving a response message for the message for indicating the presence of the downlink traffic, from the station, via the proximity communication path, transmit the downlink traffic to the station, via the path on the hotspot.

Also, in some other embodiments, the path on the hotspot may be generated based on information regarding use of the hotspot transmitted to the station, via the proximity communication path.

Also, in some other embodiments, the controller may be further configured to, if another station which does not support the idle mode accesses via another path on the hotspot, switch the hotspot mode from the idle mode to the active mode.

As stated above, an operating method of a station in a wireless environment may include transmitting a message for indicating presence of uplink traffic, to a mobile AP, via a proximity communication path, receiving a response message for the message from the mobile AP, via the proximity communication path, and transmitting the uplink traffic to the mobile AP, via a path on the hotspot, wherein the response message for the message may be transmitted in response to switching a hotspot mode of the mobile AP from an idle mode to an active mode.

In some embodiments, the operating method of the station may further include, if the transmission of the uplink traffic is completed, activating a timer of the station corresponding to a timer for switching the hotspot mode of the mobile AP, and detecting that the hotspot mode of the mobile AP is switched from the active mode to the idle mode through the activated timer of the station.

Also, in some other embodiments, the timer for switching the hotspot mode of the mobile AP may be determined according to a traffic type associated with at least one of the station and the mobile AP.

Also, in some other embodiments, the timer for switching the hotspot mode of the mobile AP may be determined according to a power state of a battery of the mobile AR.

Also, in some other embodiments, the operating method of the station may further include receiving a message for indicating a presence of downlink traffic from the mobile AP, via the proximity communication path, transmitting a response message for the message for indicating the presence of the downlink traffic to the mobile AP, and, in response to the response message, receiving the downlink traffic from the mobile AP, via the path on the hotspot.

Also, in some other embodiments, the path on the hotspot may be generated based on information regarding use of the hotspot transmitted to the station, via the proximity communication path.

An apparatus of a station in a wireless environment may include a controller, a proximity communication unit operatively coupled to the controller and a WLAN communication unit operatively coupled to the controller, wherein the controller may be configured to transmit a message for indicating presence of uplink traffic, to a mobile AP, via a proximity communication path, to receive a response message for the message from the mobile AP, via the proximity communication path, and to transmit the uplink traffic to the mobile AP, via a path on the hotspot, wherein the response message for the message may be transmitted in response to switching a hotspot mode of the mobile AP from an idle mode to an active mode.

In some other embodiments, the controller may be further configured to, if the transmission of the uplink traffic is completed, activate a timer of the station corresponding to a timer for switching the hotspot mode of the mobile AP, and detect that the hotspot mode of the mobile AP is switched from the active mode to the idle mode through the activated timer of the station.

Also, in some other embodiments, the timer for switching the hotspot mode of the mobile AP may be determined according to a traffic type associated with at least one of the station and the mobile AP.

Also, in some other embodiments, the timer for switching the hotspot mode of the mobile AP may be determined according to a power state of a battery of the mobile AP.

Also, in some other embodiments, the controller may be further configured to receive a message for indicating a presence of downlink traffic from the mobile AP, via the proximity communication path, transmit a response message for the message for indicating the presence of the downlink traffic to the mobile AP, and in response to the response message, receive the downlink traffic from the mobile AP, via the path on the hotspot.

Also, in some other embodiments, the path on the hotspot may be generated based on information regarding use of the hotspot transmitted to the station, via the proximity communication path.

The methods according to the embodiments described in the claims or the specification of the present disclosure may be implemented in hardware, software, or a combination of hardware and software.

For the software implementation, a computer-readable storage medium which stores one or more programs (software modules) may be provided. One or more programs stored in the computer-readable storage medium may be configured for execution by one or more processors of an electronic device. One or more programs may include instructions for enabling the electronic device to execute the methods according to the embodiments described in the claims or the specification of the present disclosure.

Such a program (software module, software) may be stored to a random access memory, a non-volatile memory including a flash memory, a ROM, an EEPROM, a magnetic disc storage device, a compact disc (CD)-ROM, digital versatile discs (DVDs) or other optical storage devices, and a magnetic cassette. Alternatively, the programs may be stored to a memory combining part or all of them. Also, a plurality of memories may be included.

Also, the programs may be stored in an attachable storage device accessible via a communication network such as Internet, Intranet, LAN, wide LAN (WLAN), or storage area network (SAN), or a communication network by combining these networks. Such a storage device may access an apparatus which realizes an embodiment of the present disclosure through an external port. Also, a separate storage device on the communication network may access the apparatus which realizes an embodiment of the present disclosure.

In the specific embodiments of the present disclosure as described above, the elements included in the disclosure are expressed in a singular or plural form. However, the singular or plural expression is appropriately selected according to a proposed situation for the convenience of explanations, the present disclosure is not limited to a single element or a plurality of elements, the elements expressed in the plural form may be configured as a single element, and the elements expressed in the singular form may be configured as a plurality of elements.

Meanwhile, the detailed description of the present disclosure has been described with reference to certain embodiments thereof, but various modifications may be made without departing from the scope of this disclosure. Therefore, the scope of this disclosure should not be limited to the described embodiments but should be defined by the claims as below and their equivalents within the scope of the claims.

The invention claimed is:

1. A method of a mobile access point (AP) in a wireless environment, comprising:
receiving, from a station, a message for indicating a presence of uplink traffic via a proximity communication path in low power connection state in which a mode of a hotspot is switchable between an idle mode and an active mode based on traffic information;
in response to receiving the message, switching the mode of the hotspot from the idle mode to the active mode;
in response to switching to the active mode, transmitting a response message for the message to the station, via the proximity communication path;
receiving the uplink traffic from the station, via a path on the hotspot; and
in response to detecting that another station that does not support the low power connection state accesses via another path on the hotspot, switching a connection state from the low power connection state to a normal power connection state,
wherein the mode of the hotspot remains in the active mode in the normal power connection state.

2. The method of claim 1, further comprising:
if the reception of the uplink traffic is completed, activating a timer for switching the mode of the hotspot; and
if the activated timer expires, switching the mode of the hotspot from the active mode to the idle mode.

3. The method of claim 2, wherein the timer is determined based on a traffic type associated with at least one of the station and the mobile AP.

4. The method of claim 2, wherein the timer is determined based on a power state of a battery of the mobile AP.

5. The method of claim 1, further comprising:
in response to identifying downlink traffic to the station, switching the mode of the hotspot from the idle mode to the active mode;
in response to switching to the active mode, transmitting a message for indicating a presence of the downlink traffic, to the station, via the proximity communication path; and
if receiving a response message for the message for indicating the presence of the downlink traffic, from the station, via the proximity communication path, transmitting the downlink traffic to the station, via the path on the hotspot.

6. The method of claim 1, wherein the path on the hotspot is generated based on information regarding a use of the hotspot transmitted to the station, via the proximity communication path.

7. The method of claim 1, wherein detecting that the another station that does not support low power connection state accesses via another path on the hotspot is performed based on address information obtained from the another station with table information stored in the AP.

8. An apparatus of a station in a wireless environment, comprising:
at least one processor;
a first transceiver for a proximity communication, operatively coupled to the at least one processor; and
a second transceiver for a wireless local area network (WLAN) communication, operatively coupled to the at least one processor,
wherein the at least one processor is configured to:
transmit a message for indicating a presence of uplink traffic, to a mobile access point (AP), via a proximity communication path in low power connection state in which a mode of a hotspot is switchable between an idle mode and an active mode based on traffic information,
receive a response message for the message from the mobile AP, via the proximity communication path, and
transmit the uplink traffic to the mobile AP, via a path on the hotspot,
wherein the response message for the message is transmitted in response to switching the mode of the hotspot of the mobile AP from the idle mode to the active mode, and
wherein the path on the hotspot is generated based on information regarding a use of the hotspot transmitted to the station, via the proximity communication path.

9. The apparatus of claim 8, wherein the at least one processor is further configured to:
if the transmission of the uplink traffic is completed, activate a timer of the station corresponding to a timer for switching the mode of the hotspot of the mobile AP, and
detect that the mode of the hotspot of the mobile AP is switched from the active mode to the idle mode through the activated timer of the station.

10. The apparatus of claim 9, wherein the timer is determined based on a traffic type associated with at least one of the station and the mobile AP.

11. The apparatus of claim 9, wherein the timer is determined based on a power state of a battery of the mobile AP.

12. The apparatus of claim 8, wherein the at least one processor is further configured to:
receive, from the mobile AP, a message for indicating a presence of downlink traffic, via the proximity communication path,
transmit, to the mobile AP, a response message for the message for indicating the presence of the downlink traffic, and
in response to the response message, receive the downlink traffic from the mobile AP, via the path on the hotspot.

13. An apparatus of a mobile access point (AP) in a wireless environment, comprising:
at least one processor;
a first transceiver for a proximity communication, operatively coupled to the at least one processor; and
a second transceiver for a wireless local area network (WLAN) communication, operatively coupled to the at least one processor,
wherein the at least one processor is configured to:
receive a message for indicating a presence of uplink traffic, from a station, via a proximity communication path in low power connection state in which a mode of a hotspot is switchable between an idle mode and an active mode based on traffic information, in response to receiving the message, switch the mode of the hotspot from the idle mode to the active mode, in response to switching to the active mode, transmit a response message for the message to the station, via the proximity communication path, receive the uplink traffic from the station, via a path on the hotspot, and in response to detecting that another station that does not support a low power connection state accesses via another path on the hotspot, switch a connection state from the low power connection state to a normal power connection state, wherein the mode of the hotspot remains in the active mode in the normal power connection state.

14. The apparatus of claim 13, wherein the at least one processor is further configured to:

if the reception of the uplink traffic is completed, activate a timer for switching the mode of the hotspot, and if the activated timer expires, switch the mode of the hotspot from the active mode to the idle mode.

15. The apparatus of claim 14, wherein the timer is determined based on a traffic type associated with at least one of the station and the mobile AP.

16. The apparatus of claim 14, wherein the timer is determined based on a power state of a battery of the mobile AP.

17. The apparatus of claim 13, wherein the at least one processor is further configured to:

in response to a generation of downlink traffic, switch the mode of the hotspot from the idle mode to the active mode, in response to switching to the active mode, transmit a message for indicating a presence of downlink traffic, to the station, via the proximity communication path, and if receiving a response message for the message for indicating the presence of the downlink traffic, from the station, via the proximity communication path, transmit the downlink traffic to the station, via the path on the hotspot.

18. The apparatus of claim 13, wherein the path on the hotspot is generated based on information regarding a use of the hotspot transmitted to the station, via the proximity communication path.

* * * * *